(12) United States Patent
Valiveti et al.

(10) Patent No.: US 8,582,582 B2
(45) Date of Patent: Nov. 12, 2013

(54) IN-BAND CONTROL PLANE AND MANAGEMENT FUNCTIONALITY IN OPTICAL LEVEL ONE VIRTUAL PRIVATE NETWORKS

(75) Inventors: Radhakrishna Valiveti, Fremont, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 696 days.

(21) Appl. No.: 12/748,370

(22) Filed: Mar. 26, 2010

(65) Prior Publication Data

US 2011/0236018 A1 Sep. 29, 2011

(51) Int. Cl.
*H04L 12/28* (2006.01)

(52) U.S. Cl.
USPC ...................................... 370/395.51; 370/392

(58) Field of Classification Search
None
See application file for complete search history.

(56) References Cited

U.S. PATENT DOCUMENTS

| | | | | |
|---|---|---|---|---|
| 8,184,634 | B2* | 5/2012 | Nonaka | 370/392 |
| 2004/0151500 | A1* | 8/2004 | Misawa et al. | 398/58 |
| 2005/0053079 | A1* | 3/2005 | Havala | 370/400 |
| 2005/0216590 | A1* | 9/2005 | Aubin et al. | 709/226 |
| 2006/0187854 | A1* | 8/2006 | Booth et al. | 370/254 |
| 2007/0025276 | A1* | 2/2007 | Zwiebel et al. | 370/256 |
| 2008/0025218 | A1* | 1/2008 | Liu | 370/235 |

* cited by examiner

*Primary Examiner* — Phirin Sam
(74) *Attorney, Agent, or Firm* — Harrity & Harrity, LLP; David L. Soltz

(57) ABSTRACT

A method performed by an optical node, operating as a first network edge device of an optical layer one virtual private network (L1VPN), includes generating, by a first module of the optical node, a first optical data frame, where the first optical data frame includes an L1VPN overhead, and where the L1VPN overhead includes a control plane communication field; generating, by a second module of the optical node, a first control plane message for a second network edge device of the optical L1VPN, where the second network edge device is connected to the first network edge device across a provider network via an optical L1VPN link; incorporating, by the first module, the first control plane message into the control plane communication field of the first optical data frame; and transmitting, by the first module, the first optical data frame to the second network edge device via the optical L1VPN link.

19 Claims, 15 Drawing Sheets

IN-BAND CONTROL PLANE AND MANAGEMENT FUNCTIONALITY IN OPTICAL LEVEL ONE VIRTUAL PRIVATE NETWORKS

BACKGROUND

Optical networks are becoming increasingly appealing as demands for communication services continue to increase. For example, optical networks benefit from the high bandwidths and low bit error rate of optical fibers. The establishment of optical networks has led to the development of new services. One such service may include an optical layer one virtual private network (L1VPN). An optical L1VPN may allow a customer to utilize a provider network to establish optical communication paths between remote sites of the customer. The optical communication path between two remote sites of an L1VPN may appear as a direct layer 1 node-to-node connection from the point of view of the sites, allowing the sites to communicate as if part of a private network. The establishment and maintenance of an optical communication path for an L1VPN may require control plane communication between the remote sites.

SUMMARY

According to one aspect, a method performed by an optical node, operating as a first network edge device of an optical layer one virtual private network (L1VPN), may include generating, by a first module of the optical node, a first optical data frame, where the first optical data frame includes an L1VPN overhead, and where the L1VPN overhead includes a control plane communication field; generating, by a second module of the optical node, a first control plane message for a second network edge device of the optical L1VPN, where the second network edge device is connected to the first network edge device across a provider network via an optical L1VPN link; incorporating, by the first module, the first control plane message into the control plane communication field of the first optical data frame; and transmitting, by the first module, the first optical data frame to the second network edge device via the optical L1VPN link.

According to another aspect, a network node, configured to operate as a first network edge device of an optical layer one virtual private network (L1VPN), may include one or more first modules that may generate a first optical data frame, where the first optical data frame includes an L1VPN overhead, and where the L1VPN overhead includes a control plane communication field; receive a first control plane message, where the first control plane message relates to a control plane processing operation in the optical L1VPN; populate the control plane communication field with the first control plane message; and transmit the first optical data frame to the second network edge device, associated with the optical L1VPN, across a provider network via an optical L1VPN link; and a second module to perform control plane processing associated the optical L1VPN; generate the first control plane message; and provide the first control plane message to one of the one or more first modules.

According to yet another aspect, a network edge device may include means for generating an optical data frame for transmission in an optical layer one virtual private network (L1VPN), where the optical data frame includes an L1VPN overhead, and where the L1VPN overhead includes a control plane communication field; means for generating a control plane message for a second network edge device of the optical L1VPN, where the control plane message relates to a control plane processing operation in the optical L1VPN; means for incorporating the first control plane message into the control plane communication field; and means for transmitting the first optical L1VPN frame to the second network edge device via an optical L1VPN link associated with the optical L1VPN.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
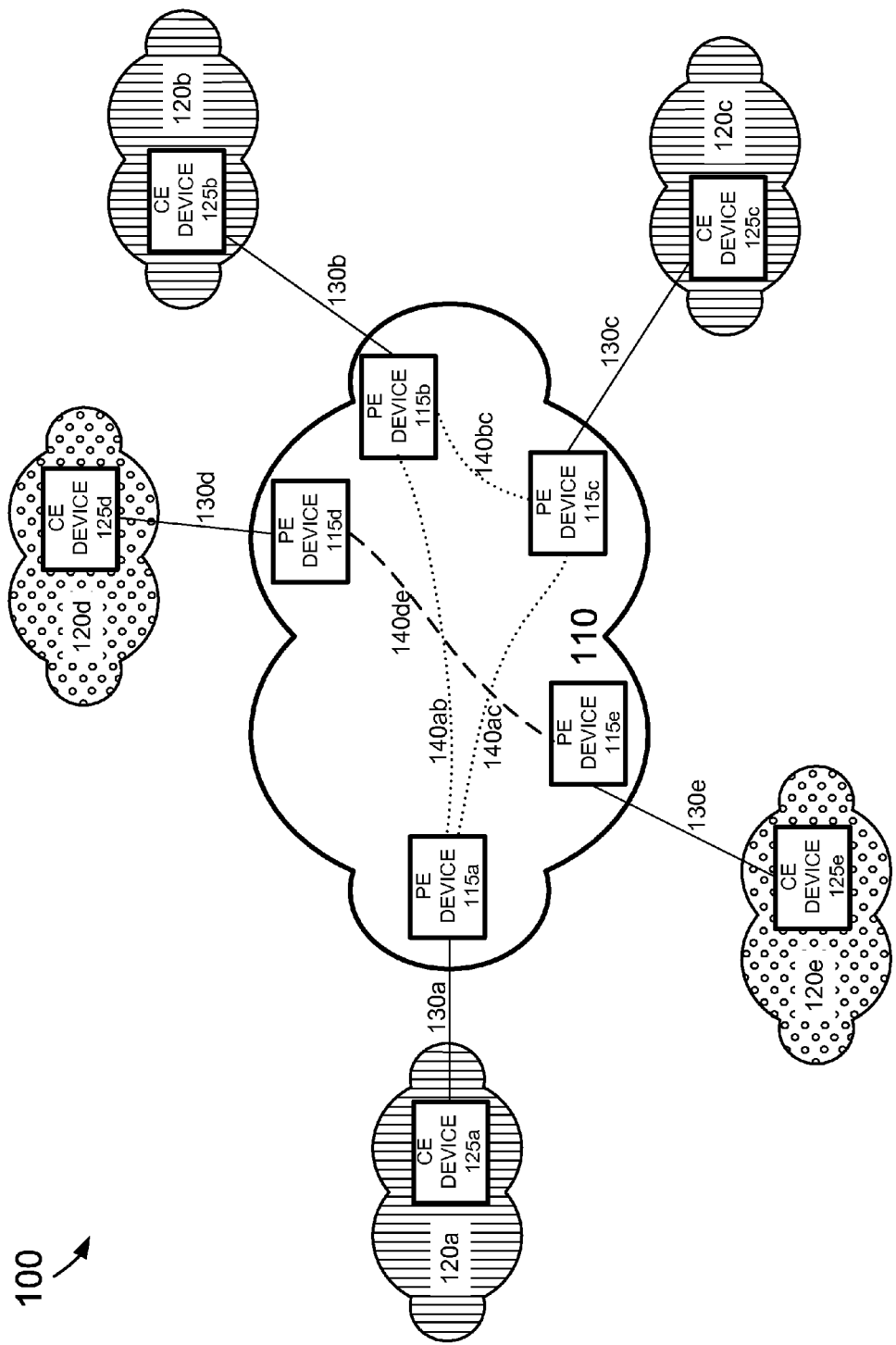
FIG. 1 is a diagram illustrating a network in which systems and/or methods described herein may be implemented.

The following detailed description of the invention refers to the accompanying drawings. The same reference numbers may be used in different drawings to identify the same or similar elements. Also, the following detailed description does not limit the scope of the invention. Instead, the scope of the invention is defined by the appended claims and equivalents.

An implementation, described herein, may relate to in-band control plane processing in optical L1VPNs (referred to herein as "L1VPNs") and/or to management processing in L1VPNs. Optical networks may separate data plane processing from control plane processing. Data plane processing may refer to the exchange of data between nodes in a network, such as best-effort traffic data or real-time audio or video data.

Control plane processing may refer to the exchange of information between nodes in a network related to the establishment and management of data plane processing. For example, control plane processing may include link management (e.g., control channel management, link property correlation, link connectivity verification, fault management, or link restoration), routing (e.g., path selection and computation, discovery and monitoring of network topology, or wavelength assignment), resource reservation (e.g., provisioning, maintaining, and deleting connections associated with particular quality of service requirements), and traffic engineering (e.g., resource discovery, adapting traffic flows onto existing network topologies, or allocating resources to traffic flows). Control plane processing may be implemented, for example, using a Generalized Multi-Protocol Label Switching (GMPLS) protocol stack. A GMPLS protocol stack may include, for example, protocols relating to link management, routing, and resource reservation.

Management processing may refer to management and configuration of a virtual private network. For example, management processing may include querying a virtual private network for performance or monitoring statistics associated with the virtual private network or pertaining to network node resources, performing software updates, enabling or disabling particular interfaces, or checking outstanding alarms within the virtual private network (e.g., alarms awaiting manual action to rectify a problem). Management processing messages within an L1VPN may be initiated by a user (e.g., by an administrator of the L1VPN). Alternatively, or additionally, management processing messages within an L1VPN may be initiated by one or more management processing servers, such as a Digital Network Architecture (DNA) server.

In basic L1VPN service, a provider network may establish data plane connectivity between sites belonging to a customer network. In order to operate a GMPLS-enabled network, a control plane channel and/or a management channel may be established out-of-band with respect to the data plane. For example, a data plane optical circuit path between two customer devices may be established via a provider optical network, while the control plane channel and/or management channel may be established via a packet-based Internet Protocol (IP) network. Thus, GMPLS packets relating to control plane processing of the optical path may need to be exchanged between the two customer devices via the IP network. Establishing and maintaining an out-of-band control channel and/or a management channel may be undesirable, as it may require the customer network to configure, and depend on, an out-of-band communication path.

As described herein, an in-band solution may eliminate the need for an out-of-band control plane channel and/or management channel. A data frame may include a first overhead, which may include an XTP overhead, with columns to the left of a payload, the payload, and a second overhead with columns to the right of the payload. The second overhead may include an L1VPN overhead. The L1VPN overhead may include one or more second overhead columns, where each column may carry information corresponding to information included in an optical data unit (ODU) described in ITU-T Recommendation G.709. An in-band control channel may be established by allocating a first space in an L1VPN overhead of a data frame for control plane messages. An in-band management channel may be established by allocating a second space in an L1VPN overhead of a data frame for management processing message.

For example, allocated space within an L1VPN overhead of a data frame may include one or more control channel communication fields, which may carry control plane messages and/or management processing messages between customer edge devices of an L1VPN. A control module, of a customer edge device, may generate control plane messages, and an interface card of the customer edge device may populate one or more control channel communication fields of an L1VPN overhead of a data frame with the generated control plane messages. Similarly, the control module may extract control plane messages from an L1VPN overhead of data frames received from another customer edge device and perform control plane operations based on the extracted messages. A control module, of a customer edge device, may receive management processing messages from a user or from a management server, may generate management processing messages, and an interface card of the customer edge device may populate one or more control channel communication fields an L1VPN overhead of a data frame with the generated control plane messages. Similarly, the control module may extract management processing messages from an L1VPN overhead of data frames received from another customer edge device and may forward information included in the extracted management processing messages to a user or a management server.

Additionally, implementations described herein may relate to stacked (or nested) L1VPN services. Providing in-band control plane processing may allow a first customer network, using a first L1VPN service, to become a provider network to a second customer network. Stacked L1VPN services may be implemented by stacking second overhead columns in data frames. For example, additional second overhead columns may be added to, or allocated in, an L1VPN overhead of a data frame to incorporate a second L1VPN service. Additional second overhead columns may be allocated, or de-allocated, by, for example, adjusting a top-of-stack (TOS) pointer located in a switching transport path (XTP) overhead of a data frame. The TOS pointer may indicate how much space in the L1VPN overhead is being used. The additional second overhead columns may include one or more control channel communication fields, which may allow the second L1VPN service to implement in-band control plane processing via a path through the first L1VPN service. Additional stacked L1VPN services may be implemented by adding, or allocating, additional second overhead columns in a second overhead of a data frame.

Exemplary Network

FIG. 1 is a diagram illustrating a network 100 in which systems and/or methods described herein may be implemented. Network 100 may include provider network 110 and customer networks 120a-120e (referred to collectively as "customer networks 120," and individually as "customer network 120").

Provider network 110 may include nodes interconnected via optical connections. A particular node of provider network 110 may include a digital switching device (e.g., an Optical Transport Network (OTN) device), a dense wavelength division multiplexing (DWDM) device, or a device that is a combination of a digital switching device and a DWDM device. The nodes of provider network 110 may perform digital or optical multiplexing operations (e.g., receive individual signals on individual channels and generate a multiplexed signal, such as a multiplexed digital signal or a multi-wavelength optical signal, that may be transmitted on a single channel), amplification operations (e.g., amplify the multiplexed signal), add-drop multiplexing operations (e.g., receive the multiplexed signal and separate the multiplexed signal back into individual client signals that may be transmitted on individual channels), and/or demultiplexing operations (e.g., remove one or more signals from the multiplexed signal). Some nodes of provider network 110 may be configured to operate as provider edge (PE) devices 115a-115e (referred to collectively as "PE devices 115," and individually as "PE device 115"). PE devices 115 may interface with customer networks 120. For the sake of clarity, intermediate nodes of provider network 110 that are not functioning as PE devices 115 are not shown in FIG. 1.

Customer network 120 may include network devices interconnected via either optical or digital connections. The network devices, of customer network 120, may include any type of digital network device, such as a router, a switch, or a firewall, or an optical node, such as a digital switching device (e.g., an OTN device), a DWDM device, or a device that is a combination of a digital switching device and a DWDM device. Some network devices of customer network 120 may be configured to operate as customer edge (CE) devices 125a-125e (referred to collectively as "CE devices 125," and individually as "CE device 125"). A particular CE device 125 may interface with a particular PE device 115 of provider network 110 through a CE-PE optical connection 130 (referred to collectively as "CE-PE connections 130," and individually as "CE-PE connection 130"). For the sake of clarity, intermediate nodes of customer network 120 that are not functioning as CE devices 125 are not shown in FIG. 1.

Remote customer networks 120 may be connected via provider network 110 using an L1VPN link 140 (referred to collectively as "L1VPN links 140," and individually as "L1VPN link 140"). L1VPN links 140 may be realized as a signaled Sub Network Connection (SNC) or as a series of manual cross-connects within provider network 110. Once a particular L1VPN link 140 has been created in provider network 110, the two customer networks 120 connected by L1VPN link 140 may operate like an independent transport network. Provider network 110 may remain agnostic to services offered by the L1VPN of the two (or more) customer networks 120 to its customers.

FIG. 1 illustrates, for exemplary purposes, two separate L1VPN instances. Customer networks 120a, 120b, and 120c may form a first L1VPN instance and customer networks 120d and 120e may form a second L1VPN instance. Thus, customer network 120a may be connected to provider network 110 via CE-PE connection 130a from CE device 125a to PE device 115a; customer network 120b may be connected to provider network 110 via CE-PE connection 130b from CE device 125b to PE device 115b; and customer network 120c may be connected to provider network 110 via CE-PE connection 130c from CE device 125c to PE device 115c. Customer network 120a may be connected to customer network 120b via L1VPN link 140ab and to customer network 120c via L1VPN link 140ac; and customer networks 120b and 120c may be connected via L1VPN link 140bc. Similarly, customer network 120d may be connected to provider network 110 via CE-PE connection 130d from CE device 125d to PE device 115d; customer network 120e may be connected to provider network 110 via CE-PE connection 130e from CE device 125e to PE device 115e; and customer networks 120d and 120e may be connected via L1VPN link 140de.

Although FIG. 1 shows exemplary components of network 100, in other implementations, network 100 may contain fewer components, different components, additional components, or differently arranged components than depicted in FIG. 1. Additionally or alternatively, one or more components of network 100 may perform one or more tasks described as being performed by one or more other components of network 100.

Exemplary Devices

Figure 2:
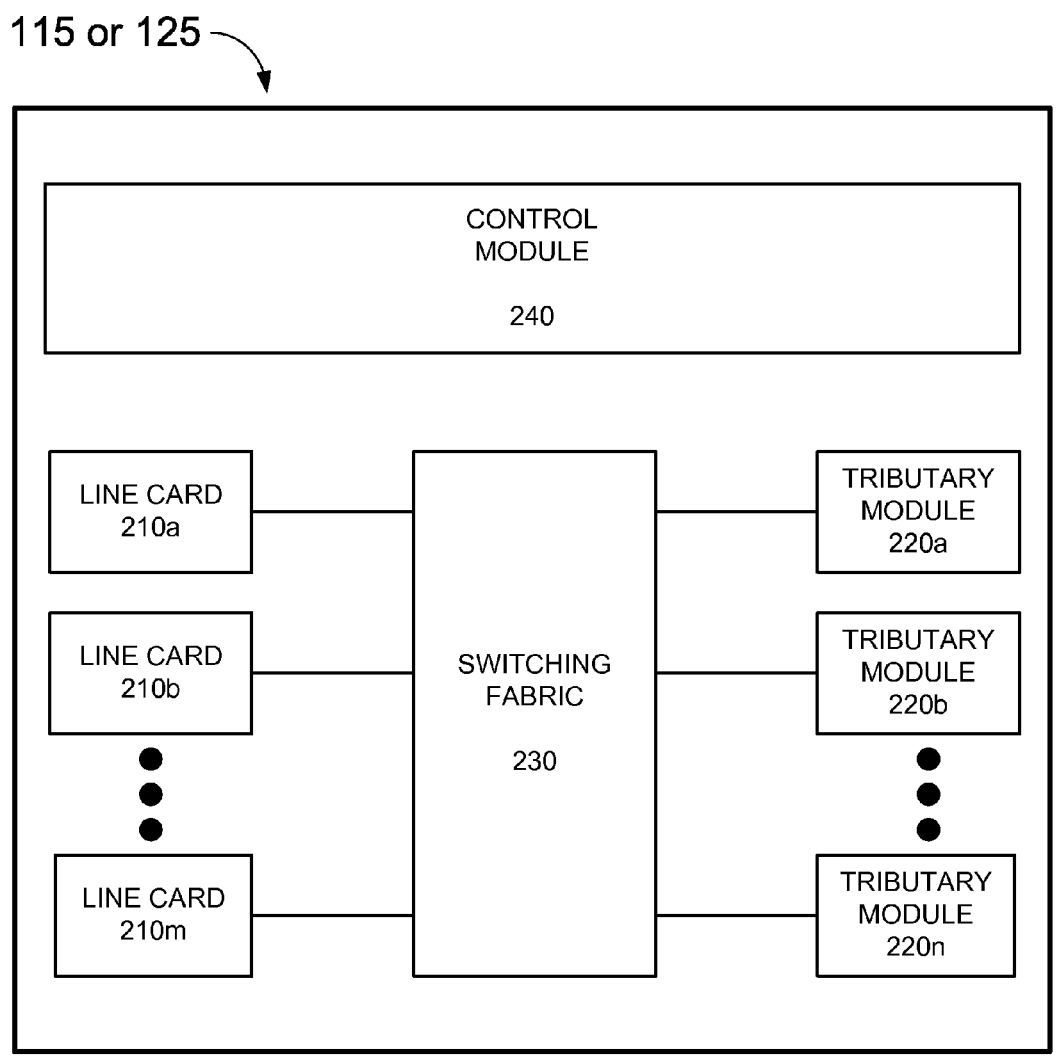
FIG. 2 is a diagram of exemplary components of a device of the network of FIG. 1.

FIG. 2 is a diagram of exemplary components of PE device 115 or CE device 125 of FIG. 1. In one implementation, PE device 115 and CE device 125 may include a same type of optical node, which may be configured to operate as either PE device 115 or CE device 125. In another implementation, PE device 115 and CE device 125 may include different types of nodes.

PE device 115 or CE device 125 may include line cards 210a-210m (referred to collectively as "line cards 210," and individually as "line card 210"), tributary modules 220a-220n (referred to collectively as "tributary modules 220," and individually as "tributary module 220"), a switching fabric 230, and a control module 240.

Line card 210 may include hardware components, or a combination of hardware and software components, that connect to a link and provide signal processing services. Line card 210 may include a receiver and/or a transmitter. The receiver may receive a digital (or optical) signal from a link, and perform various processing on the signal, such as decoding, decapsulation, etc. The transmitter may perform various processing on a signal, such as encoding, encapsulation, etc., and transmit the signal on a link.

Tributary module 220 may include hardware components, or a combination of hardware and software components, that terminate client signals. For example, tributary module 220 may support flexible adding-dropping of multiple services, such as OTN services, Synchronous Optical Networking or Synchronous Digital Hierarchy (SONET/SDH) services, GbE services, and FC services. Tributary module 220 may encapsulate client signals in a data frame. The data frame may permit all types of services to be transparent and robustly managed.

Switching fabric 230 may include a switching architecture that permits cross-connects to be established between line cards 210 and/or between line cards 210 and tributary modules 220.

Control module 240 may control the operation of PE device 115 or CE device 125, provide local and remote management of PE device 115 or CE device 125, implement control plane functionality of PE device 115 or CE device 125, receive requests to perform management processing functions, and/or provide persistent storage for software, firmware, and network management information of PE device 115 or CE device 125. Control module may transmit or receive control plane messages and/or management processing messages via line cards 210 and/or tributary modules 220.

Although FIG. 2 shows exemplary components of PE 115 or CE 120, in other implementations, PE 115 or CE 120 may contain fewer components, different components, additional components, or differently arranged components than depicted in FIG. 2. Additionally or alternatively, one or more components of PE 115 or CE 120 may perform one or more tasks described as being performed by one or more other components of PE 115 or CE 120.

Figure 3:
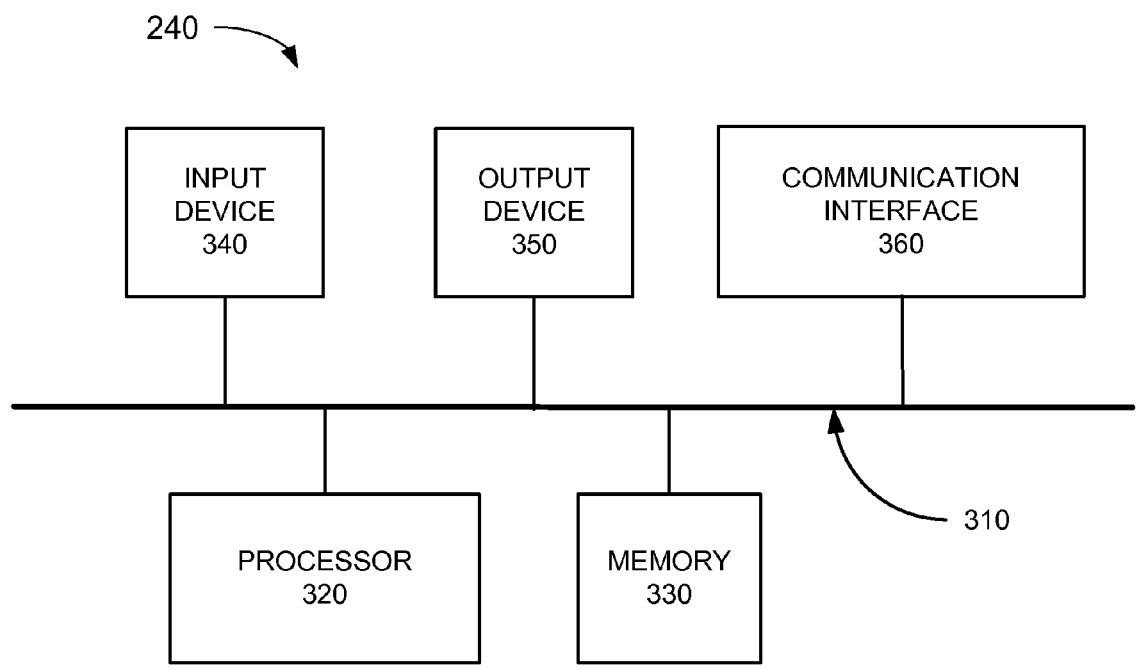
FIG. 3 is a diagram of exemplary components of a control module of the device of FIG. 2.

FIG. 3 is a diagram of exemplary components of control module 240 of FIG. 2. Control module 240 may include a bus 310, a processor 320, a memory 330, an input device 340, an output device 350, and a communication interface 360.

Bus 310 may include a path that permits communication among the components of control module 240. Processor 320 may include a processor, a microprocessor, or processing logic (e.g., an application specific integrated circuit (ASIC) or a field programmable gate array (FPGA)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory. Instructions used by processor 320 may also, or alternatively, be stored in another type of computer-readable medium accessible by processor 320. A computer-readable medium may be defined as a physical or logical memory device. A logical memory device may include memory space within a single physical memory device or spread across multiple physical memory devices.

Input device 340 may include a mechanism that permits an operator to input information to control module 240, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. In a particular implementation, control module 240 may not include input device 340 and output device 350. In such an implementation, an operator may configure control module 240 via communication interface 360.

Communication interface 360 may include any communication mechanism that allows control module 240 to communicate with another card or another component of CE device 125 or PE device 115. For example, communication interface 360 may include an Ethernet interface.

As will be described in detail below, control module 240 may perform certain operations relating to control plane processing. Control module 240 may perform these operations in response to processor 320 executing software instructions contained in a computer-readable medium, such as memory 330, another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of control module 240, in other implementations, control module 240 may contain fewer components, different components, additional components, or differently arranged components than depicted in FIG. 3. Additionally or alternatively, one or more components of control module 240 may perform one or more tasks described as being performed by one or more other components of control module 240.

Figure 4:
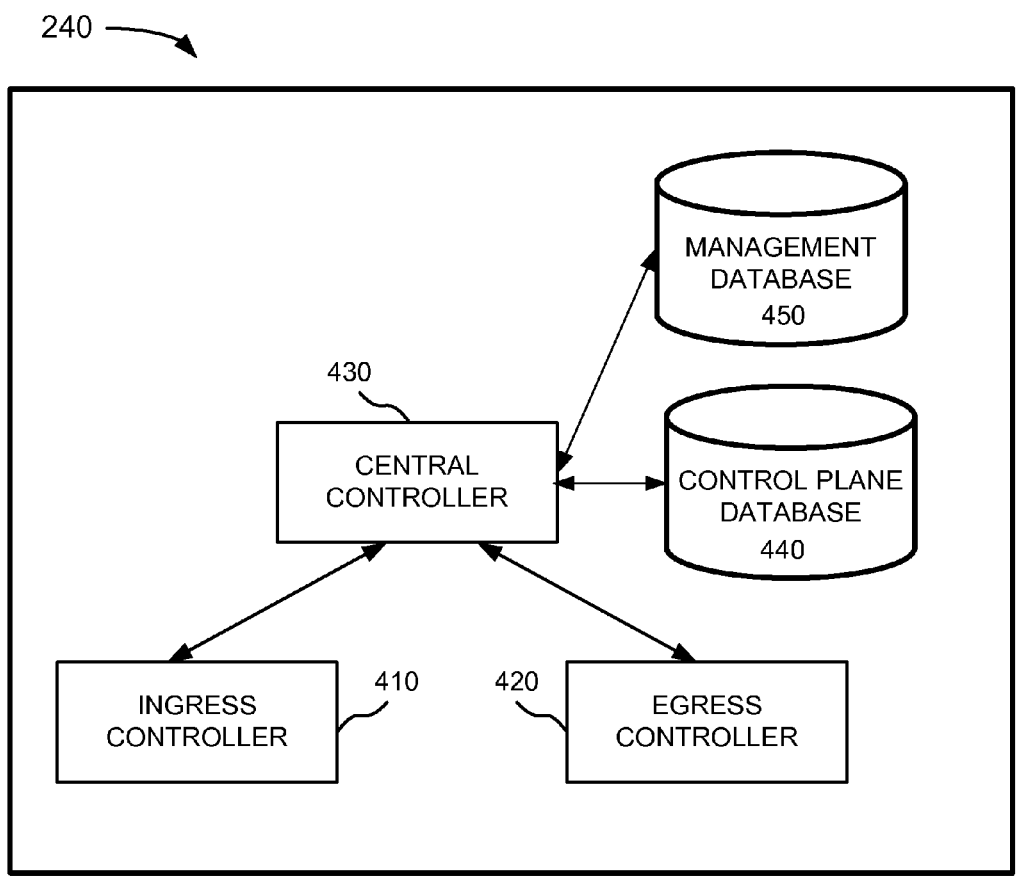
FIG. 4 is a diagram of exemplary functional components of the control module of the device of FIG. 2.

FIG. 4 is a diagram of exemplary functional components of control module 240 of FIG. 2. Control module 240 may include an ingress controller 410, an egress controller 420, a central controller 430, a control plane database 440, and a management database 450.

Ingress controller 410 may determine whether an L1VPN overhead of incoming data frames include control plane messages and/or management processing messages. In one implementation, ingress controller 410 may monitor incoming L1VPN frames. In another implementation, incoming L1VPN frames may be monitored by line card modules 210, and line card modules 210 may inform ingress controller 410 when an L1VPN overhead of a data frame includes a control plane message and/or a management processing message. Ingress controller 410 may retrieve control plane messages and/or management processing messages from the L1VPN overhead of the data frame, decode the retrieved control plane messages and/or management processing messages, and pass the decoded control plane messages and/or management processing messages to central controller 430. Ingress controller 410 may also receive management processing messages from a user or a management server via line card 210 or tributary module 220, or from a user via input device 340. In a stacked L1VPN implementation, ingress controller 410 may configure a line card to remove allocated second overhead columns from a received data frame by moving a TOS pointer.

Egress controller 420 may receive control plane messages and/or a management processing messages from central controller 430 and encode the received control plane messages and/or a management processing messages into a format compatible with L1VPN frames. In one implementation, egress controller 420 may populate a control plane communication channel field of an L1VPN frame with an encoded control plane message and/or a management processing message. In another implementation, egress controller 420 may pass encoded control plane messages and/or a management processing messages to a particular line module, and the particular line module may populate a control plane communication channel field of an L1VPN frame with the encoded control plane message and/or a management processing message. Egress controller 420 may also provide management processing messages to a user or a management server via line card 210 or tributary module 220, or to a user via output device 350, and may respond to management processing messages that include queries from other devices. In a stacked L1VPN implementation, egress controller 420 may allocate additional second overhead columns from a received data frame by moving a TOS pointer.

Central controller 430 may manage control plane functions associated with an L1VPN. For example, central controller 430 may determine when a control plane message needs to be sent to another CE device 125, and may receive control plane messages from other CE devices and act on information included in received control plane messages. Functions performed by central controller 430 may include link management, routing, resource reservation, and traffic engineering. For example, central controller 430 may generate protocol packets associated with a GMPLS stack. Central controller 430 may implement standard protocols associated with GMPLS, custom protocols, or a combination of the two. Examples of protocols, associated with a GMPLS stack, which may be implemented by central controller 430 may include Link Management Protocol (LMP), Resource Reservation Protocol (RSVP), Resource Reservation Protocol-Traffic Engineeering (RSVP-TE), User Datagram Protocol (UDP), Transmission Control Protocol (TCP), Border Gateway Protocol (BGP), Open Shortest Path First Protocol (OSPF), Open Shortest Path First Protocol-Traffic Engineering (OSPF-TE), and Intermediate System to Intermediate System Protocol (IS-IS). Central controller 430 may consult control plane database 440 during processing.

Central controller 430 may manage management processing requests associated with an L1VPN. For example, central controller 430 may respond to a received management processing request by providing system status and/or system performance in response to a request, maintain system status and/or system performance statistics, performing a software update, enable or disable an interface, and/or activate an alarm based on detecting a failure within CE device 125 (or PE device 115). Central controller 430 may consult management database 450 during processing.

Control plane database 440 may store information relating to protocol states. For example, control plane database 440 may store link information, such as link properties, redundant links, and link restoration information, routing information, such as routing tables and/or network topology maps, and/or status and properties of particular flows, such as quality of service (QoS) requirements. Control plane database 440 may be updated by central controller 430 based on information received in control plane messages included in a control plane communication channel field of an L1VPN frame.

Management database 450 may store information relating to management processing. For example, management database 450 may store information relating to pending performance requests and/or system statistics requests, system status and/or system performance statistics, software versions associated with particular nodes, status of interfaces, and/or pending alarms.

Although FIG. 4 shows exemplary functional components of control module 240, in other implementations, control module 240 may contain fewer functional components, different functional components, additional functional components, or differently arranged functional components than depicted in FIG. 4. Additionally or alternatively, one or more functional components of control module 240 may perform one or more tasks described as being performed by one or more other functional components of control module 240.

Exemplary Data Units

Figure 5:
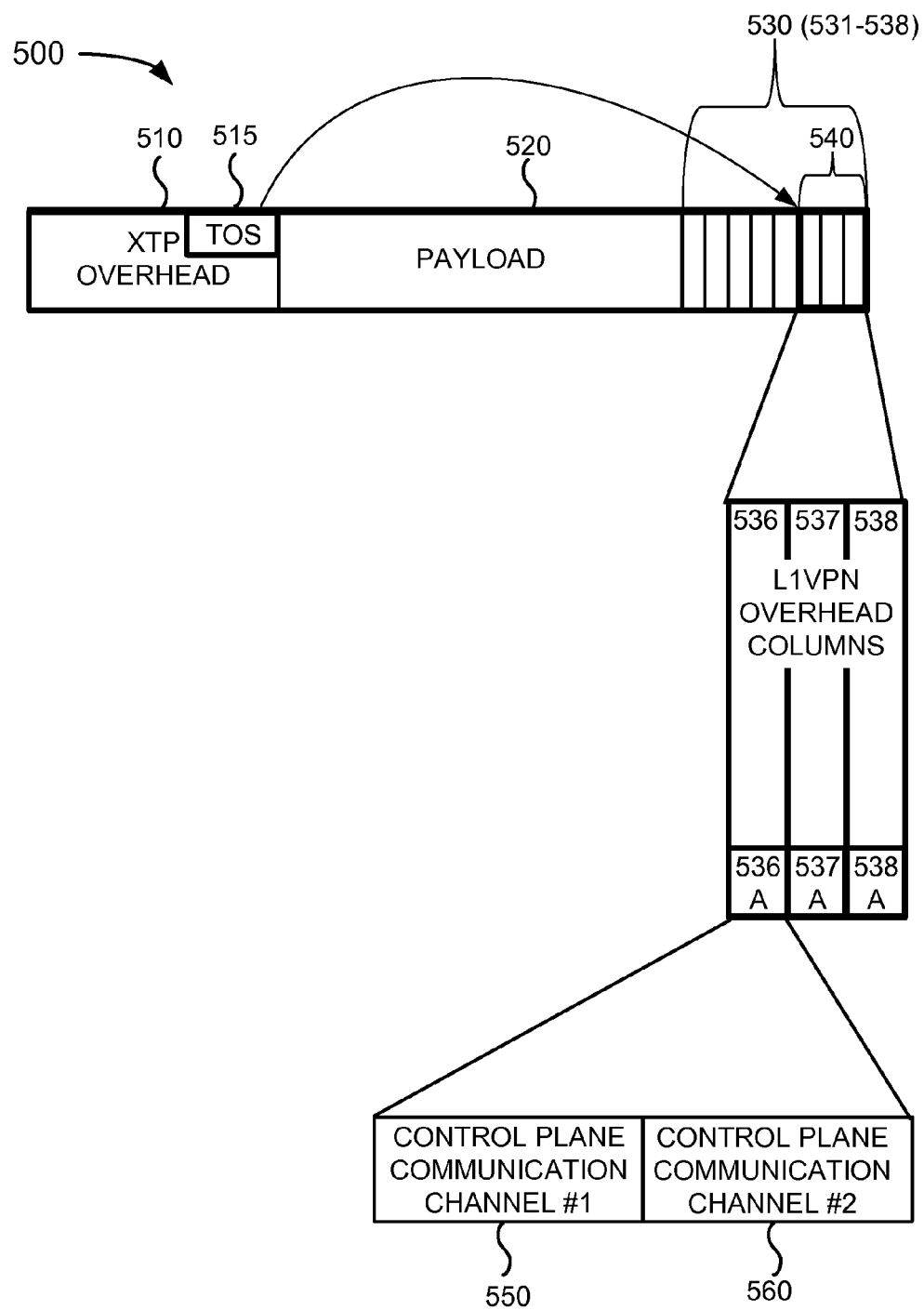
FIG. 5 is a diagram of exemplary fields of a data frame that may be transmitted within the network of FIG. 1.

FIG. 5 is a diagram of exemplary fields of a data frame 500 that may be transmitted within the network of FIG. 1. Data frame 500 may correspond to an XTP frame. In one implementation, the XTP frame is a structure of a particular, constant length and a fixed rate, which is independent of the rate of a client signal, and may use a combination of variable and fixed stuff locations to compensate for the different rate of the client signal. A "variable stuff location" may refer to a location in a frame that may or may not include client data. A "fixed stuff location" may refer to a location in a frame that includes null data. The XTP frame may be the vehicle for transporting the client signal through the optical network in a manner that is independent of the rate of the client signal. The data of the XTP frame may be arranged as bytes of data in a manner of rows and columns. When the XTP frame is transmitted, the data bytes in the first row may be transmitted, followed by the data bytes in the second row, and so forth. Thus, the transmission of the XTP frame may include the transmission of a first row, which may include transmission of first overhead data, followed by payload data, followed by the transmission of second overhead data, followed by transmission of a second row, which may include transmission of first overhead data, followed by payload data, followed by the transmission of second overhead data, etc. XTP frames are described in co-pending U.S. patent application Ser. No. 12/367,401, entitled "DUAL ASYNCHRONOUS MAPPING OF CLIENT SIGNALS OF ARBITRARY RATE," which is hereby incorporated by reference.

Data frame 500 may include a first overhead portion 510, a payload portion 520, and a second overhead portion 530. First overhead portion 510 may include an XTP overhead that may store various information relating to the creation, transmission, performance management, fault management, and/or recovery of data of data frame 500. For example, the XTP overhead may include a combination of justification control (JC) data and a negative justification opportunity (NJO) data used for processing fixed and variable stuff areas in payload portion 520. A decision may be made, once per XTP frame, whether to store data in a variable stuff location or whether to stuff the variable stuff location (e.g., store null data in the variable stuff location). First overhead 510 may include TOS pointer 515. TOS pointer 515 may point to the top of the stack of data included in second overhead columns 531-538. In other words, TOS pointer 515 may indicate how many columns of second overhead 530 are being used to carry information. For example, if three second overhead columns are being used, TOS pointer 515 may point to the beginning of second overhead column 536.

Payload portion 520 may store data associated with a client signal. Second overhead portion 530 may store data to support operation, administration, and/or maintenance (OAM) functions. Second overhead portion 530 may include one or more second overhead columns 531-538. Second overhead columns 531-538 may include multiple bytes of columns. In other words, columns 531-538 do not correspond to one byte columns (although in one implementation, columns 531-538 may correspond to one byte columns).

In one implementation, second overhead portion 530 may include eight second overhead columns 531-538. In another implementation, second overhead portion 530 may include a different number of columns. One or more second overhead columns 531-538 may be combined into an L1VPN overhead 540. In one implementation, three second overhead columns (e.g., overhead columns 536-538) may be combined into L1VPN overhead 540. In another implementation, a different number of second overhead columns 531-538, and/or a different combination of columns 531-538, may be combined into L1VPN overhead 540.

In one implementation, a single second overhead column may carry information that corresponds to information carried by an optical data unit (ODU) overhead of an ITU-T G.709 frame. For example, a single overhead column may carry information relating to tandem connection monitoring (TCM), path monitoring (PM), and/or automatic protection switching (APS), and may include one or more PM fields, one or more TCM fields, a fault type and fault location monitoring (FTFL) channel field, one or more general communication channel (GCC) fields, an APS channel field, and/or a protection communication channel (PCC) field. In another implementation, a second overhead column may include information that differs from information carried in an ODU overhead of an ITU-T G.709 frame.

Individual ones of second overhead columns 531-538 may include, among other fields, one or more communication channel fields 531A-538A. A communication channel field of one of the columns of L1VPN overhead 540 may include one or more control plane communication channel fields. For example, in one implementation, communication channel field 536A of second overhead column 536, or a communication channel field of a different one of overhead columns 531-538, may include a first control plane communication channel field 550 and a second control plane communication channel field 560. In other implementations, second overhead column 536, or a different one of second overhead columns 531-538, may include a different number of control plane communication channel fields. Control plane communication channel fields 550 and 560 may carry control plane messages and/or management processing messages.

For example, control plane communication channel field 550 may be used to carry control plane messages, and control plane communication channel field 560 may be used to carry management processing messages (or vice versa). As another example, control plane communication channel field 550 may be used to carry control plane messages, and control plane communication channel field 560 may be reserved for future use. As yet another example, control plane communication channel field 550 and control plane communication channel field 560 may be concatenated into a single control plane communication channel field used to carry control plane messages and/or management processing messages. As yet another example, control plane communication channel field 550 may be used to carry a first subset of control plane messages, and control plane communication channel field 560 may be used to carry a second subset of control plane messages. As yet another example, control plane communication channel field 550 may be used to carry messages associated with a first L1VPN link between two CE devices 125, and control plane communication channel field 560 may be used to carry messages associated with a second L1VPN link between the two CE devices 125. As yet another example, control plane communication channel field 550 may be used to carry messages between two CE devices, while control plane communication channel field 560 may be used to carry control plane messages between other network nodes of customer networks 120 that are served by the two CE devices.

In one implementation, control plane communication channel fields 550 and 560 may correspond to general communication channel #1 (GCC1) and general communication channel #2 (GCC2) of the ODU overhead of an ITU-T G.709 frame. In another implementation, control plane communication channel fields 550 and 560 may correspond to fields in a data frame with a custom format, which differs from ITU-T G.709 frames.

Although FIG. 5 shows exemplary fields of data frame 500, in other implementations, data frame 500 may contain fewer fields, different fields, additional fields, or differently arranged fields than depicted in FIG. 5. Additionally or alternatively, one or more fields of data frame 500 may carry information described as being carried by one or more other fields of data frame 500.

Figure 6:
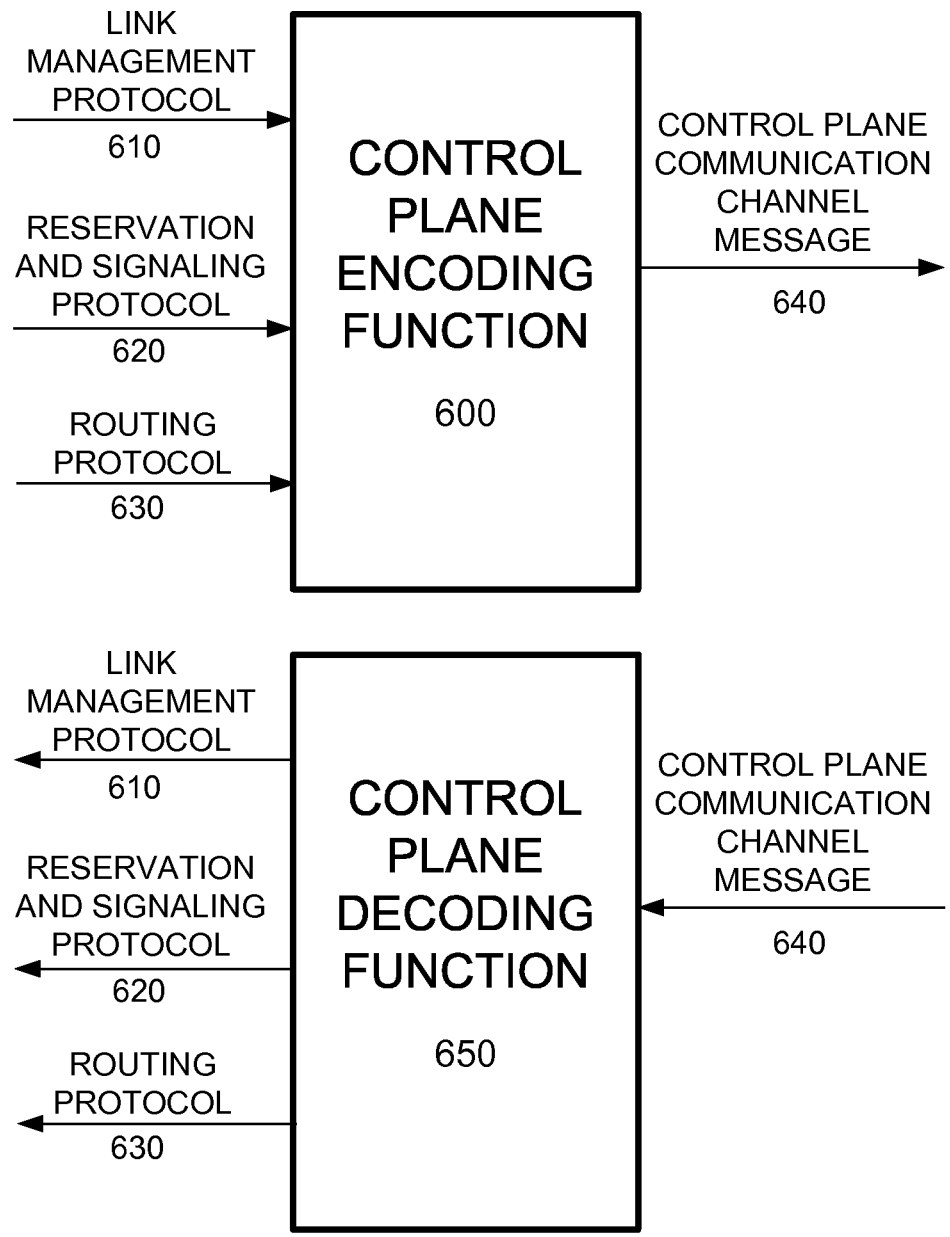
FIG. 6 is a diagram of exemplary functions of encoding and decoding control plane protocols to and from a format compatible with the control plane channel communication field of FIG. 5.

FIG. 6 is a diagram of exemplary functions of encoding and decoding control plane protocols to and from a format compatible with control plane communication channel field of FIG. 5. For example, control plane protocol packets generated by central controller 430 may not be in a format compatible with control plane communication channel fields 550 and 560, and may need to be encoded into a format compatible with control plane communication channel fields 550 and 560.

Control plane encoding function 600 may receive messages (e.g., packets) associated with control plane protocols and may encode the messages into a custom format associated with control plane communication field 550 or control plane communication field 560. In one implementation, control plane encoding function 600 may be implemented by egress controller 420. In another implementation, control plane encoding function 600 may be implemented by a different functional component of control module 240, or by a different component of CE device 125, such as line module 210 or tributary module 220.

Control plane encoding function 600 may receive standard protocol packets associated with a GMPLS protocol stack, packets associated with custom protocols, or a combination of the two. In a particular implementation, link management protocol 610 may correspond to LMP, reservation and signaling protocol 620 may correspond to RSVP-TE, and routing protocol may correspond to OSPF-TE. Control plane encoding function 600 may generate a control plane communication channel message 640, which may be inserted into control plane communication channel field 550 or 560. In one implementation, control plane encoding function 600 may be implemented as a hash function. In other implementation, control plane encoding function may be implemented using other techniques.

Control plane decoding function 650 may receive control plane communication channel messages 640 and may decode control plane communication channel messages 640 into standard protocol packets associated with a GMPLS protocol stack, packets associated with custom protocols, or a combination of the two. In one implementation, control plane encoding function 600 may be implemented by ingress controller 410. In another implementation, control plane decoding function 650 may be implemented by a different functional component of control module 240, or by a different component of CE device 125, such as line module 210 or tributary module 220.

Although FIG. 6 shows exemplary inputs and outputs of control plane encoding function 600 and control plane decoding function 650, in other implementations, control plane encoding function 600 and control plane decoding function 650 may contain fewer inputs or outputs, different inputs or outputs, additional inputs or outputs, or differently arranged inputs or outputs than depicted in FIG. 6.

Exemplary Processes

Figure 7:
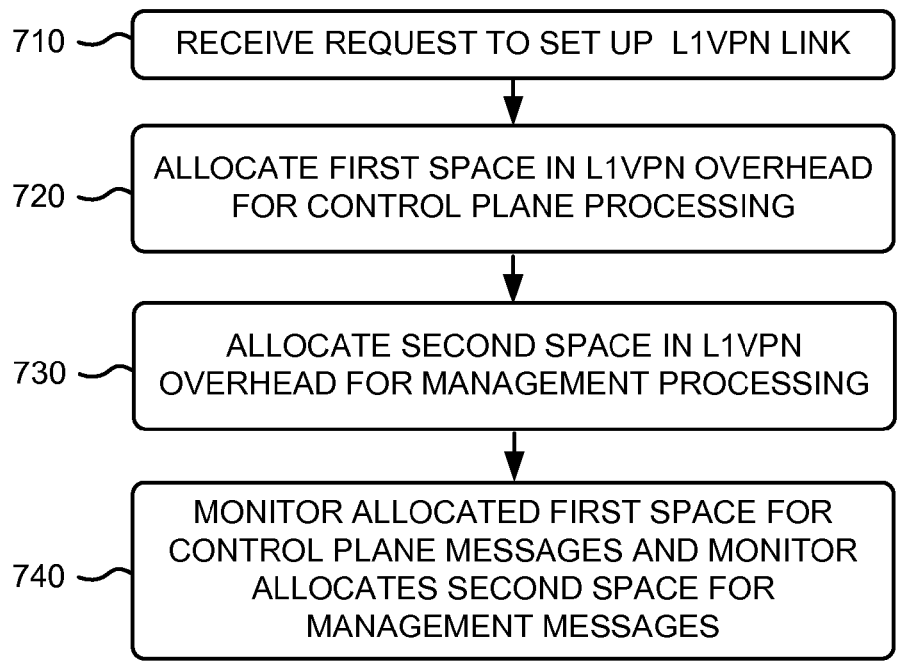
FIG. 7 is a flowchart of an exemplary process of establishing control plane processing according to an implementation described herein.

FIG. 7 is a flowchart of an exemplary process of establishing a path according to an implementation described herein. In one implementation, the process of FIG. 7 may be performed by CE device 125 (FIG. 1). In other implementations, some or all of the process of FIG. 7 may be performed by another device or a group of devices separate from or including CE device 125.

The process of FIG. 7 may include receiving a request to set up an L1VPN link (block 710). For example, a new L1VPN link may be established in an L1VPN, such as L1VPN link 140*ab* between CE device 125*a* and CE device 125*b*. Input may be provided to control module 240 of CE device 125*a*, indicating that CE device 125*b* at a remote customer network 120*b* was connected via L1VPN link 140*ab* to the first CE device 125*a*. In one implementation, a customer may manually input the information into control module 240 of CE device 125*a*. In another implementation, CE device 125*a* may receive a signal from PE device 115*a*, informing control module 240 of the new L1VPN link.

A first space may be allocated in an L1VPN overhead for control plane processing (block 720). For example, control module 240 may reserve first control plane communication channel field 550 for control plane processing, and a particular line module 210, which connects CE device 125*a* to PE device 125*a*, may be configured to populate first control plane communication channel field 550 of L1VPN frames 540 that are sent to CE device 125*b* with control plane messages.

A second space may be allocated in an L1VPN overhead for management processing (block 730). For example, control module 240 may reserve second control plane communication channel field 560 for management processing, and a particular line module 210, which connects CE device 125*a* to PE device 125*a*, may be configured to populate second control plane communication channel field 560 of L1VPN frames 540 that are sent to CE device 125*b* with management processing messages.

Allocated first space of received data frames may be monitored for control plane messages and allocated second space of received data frames may be monitored for management messages (block 740). For example, a particular line card module 210, which connects CE device 125*a* to PE device

125a, may be instructed by control module 240 to monitor first control plane communication channel field 550 of L1VPN frames 540 received from CE device 125b for control plane messages and to monitor second control plane communication channel field 560 of L1VPN frames 540 received from CE device 125b for management messages.

Figure 8:
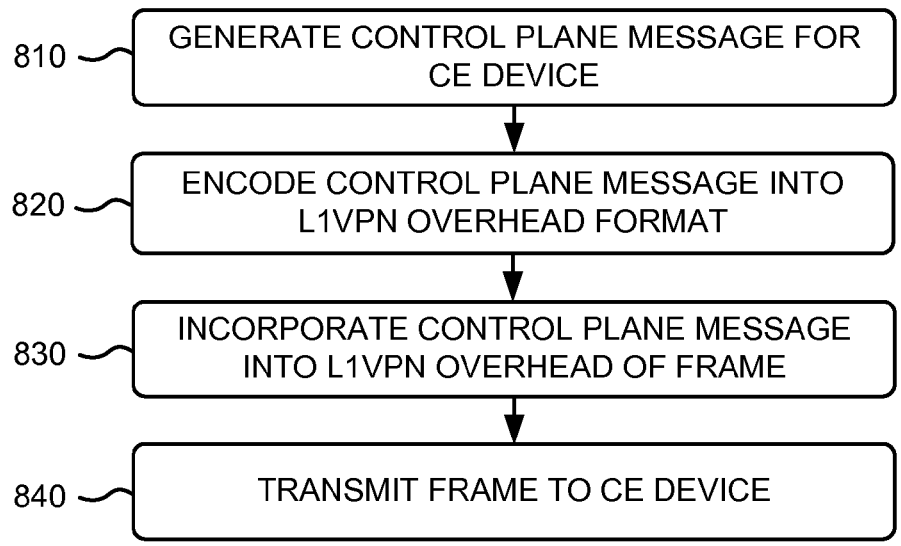
FIG. 8 is a flowchart of an exemplary process of transmitting a control plane message according to an implementation described herein.

FIG. 8 is a flowchart of an exemplary process of transmitting a control plane message according to an implementation described herein. In one implementation, the process of FIG. 8 may be performed by CE device 125. In other implementations, some or all of the process of FIG. 8 may be performed by another device or a group of devices separate from or including CE device 125.

The process of FIG. 8 may include generating a control plane message for a particular CE device (block 810). For example, central controller 430 may generate a protocol packet in response to a change in a protocol state. For example, central controller 430 may receive information that may cause central controller 430 to update a routing table or detect a change in network topology. Central controller 430 may generate a routing protocol packet to be sent to a CE device 125 across L1VPN link 140. As another example, central controller 430 may receive a request to set up a flow with a particular QoS requirement, and may generate a reservation protocol packet to be sent to CE device 125 across L1VPN link 140.

The generated control plane message may be encoded into an L1VPN overhead format (block 820). For example, egress controller 420 may activate control plane encoding function 600 to generate control plane communication channel message 640. In other implementations, the generated control plane message need not be encoded and may be directly incorporated into the L1VPN overhead of a data frame.

An encoded control plane message may be incorporated into the L1VPN overhead of a data frame (block 830). For example, line module 210 may populate control plane communication channel field 550 of the L1VPN overhead of the data frame that is to be sent to the particular CE device 125 that is to be the recipient of the generated control plane message.

The data frame may be transmitted to the CE device (block 840). For example, line module 210 may transmit the data frame to the particular device via the L1VPN link which connects the two CE devices.

A process analogous to that illustrated in FIG. 8 may be performed with respect to management processing. For example, if L1VPN overhead 540 includes a management processing communication field (e.g., control plane communication channel #2 560), control module 240 may receive a query relating to management processing associated with the second network edge device. The query may be received from a user (e.g., an administrator) or from a management server. The query may relate to, for example, determining performance or monitoring statistics associated with the virtual private network or pertaining to resources of CE device 125 or a remote CE device 125, determining a software version of software running on CE device 125 or on a remote CE device 125, enabling or disabling particular interfaces of CE device 125 or a remote CE device, and/or checking outstanding alarms within the virtual private network (e.g., alarms awaiting manual action to rectify a problem) or associated with CE device 125 or a remote CE device.

Control module 240 may determine that the query is intended for a remote CE device in the L1VPN, may generate a management processing message based on the received query, may encode the management processing message into a format compatible with the management processing communication field, and provide the generated management processing message to line card 210. Line card 210 may incorporate the generated first management processing message into the management processing communication field of L1VPN overhead 540.

Figure 9:
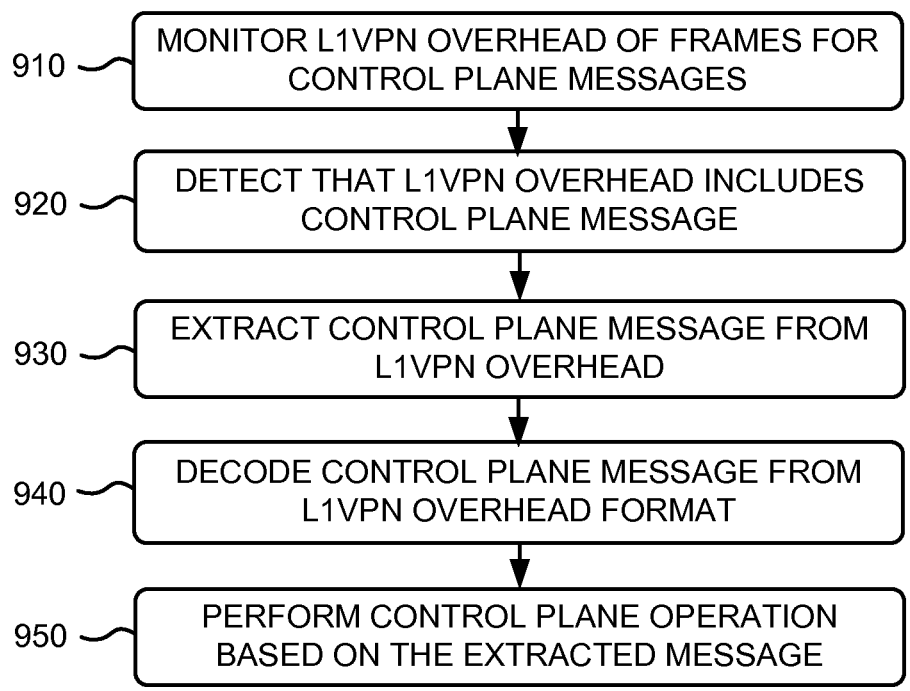
FIG. 9 is a flowchart of an exemplary process of receiving a control plane message according to an implementation described herein.

FIG. 9 is a flowchart of an exemplary process of receiving a control plane message according to an implementation described herein. In one implementation, the process of FIG. 9 may be performed by CE device 125. In other implementations, some or all of the process of FIG. 9 may be performed by another device or a group of devices separate from or including CE device 125.

The process of FIG. 9 may include monitoring the L1VPN overhead of received data frames for control plane messages (block 910). For example, a particular line module 210 of CE device 125b may receive a data frame via L1VPN link 140ab from CE device 125a and determine whether the L1VPN overhead of the received data frame includes a control plane message. In one implementation, ingress controller 410 (or line module 210) may monitor control plane communication channel field 550 or 560 to determine whether control plane communication channel field 550 or 560 is empty or includes information. In another implementation, data frame 550 may include a control plane bit, which may be set if L1VPN frame 500 includes a control plane message.

It may be detected that the L1VPN overhead of the received data frame includes a control plane message (block 920). For example, ingress controller 410 (or line module 210) may detect a control plane message. The detected control plane message may be extracted from the L1VPN overhead of the data frame (block 930). For example, line module 210 may retrieve the control message from control plane communication channel field 550 or 560 of the L1VPN overhead of the received data frame and forward the retrieved control plane message to ingress controller 410.

The extracted control plane message may be decoded from the L1VPN overhead format (block 940). For example, ingress controller 410 may activate control plane decoding function 650 to retrieve a GMPLS protocol packet (or a custom protocol packet). In other implementations, the protocol packet need not be decoded and may be directly recovered from the control plane message.

A control plane operation may be performed based on the extracted control plane message (block 950). For example, ingress controller 410 may forward the decoded protocol packet to central controller 430 and central controller 430 may perform a control plane operation based on information included in the decoded protocol packet.

A process analogous to that illustrated in FIG. 9 may be performed with respect to management processing. For example, if L1VPN overhead 540 includes a management processing communication field (e.g., control plane communication channel #2 560), line card 210 may receive, from a remote CE device associated with the L1VPN, an optical data frame via an optical L1VPN link. Line card 210 may detect that the management processing communication field of the L1VPN overhead of the received optical data frame includes a management processing message and may retrieve the management processing message from the management processing communication field of L1VPN overhead 540 of the received optical data frame, and provide the retrieved management processing message to control module 240. Control module 240 may decode the management processing message from a format compatible with the management processing communication field and may determine, for example, that the management processing message includes a query requesting information relating to management processing of the CE device (which received the message).

Control module 240 may retrieve the requested information from management processing database 450 and may generate a responding management processing message based on the retrieved information. Control module 240 may encode the responding management processing message into a format compatible with the management processing communication field and may provide the encoded responding management processing message to line card 210.

Line card 210 may incorporate the encoded responding management processing message into the management processing communication field of L1VPN overhead 540 of a data frame destined for a CE device that originated the management processing query.

Additional Exemplary Network

Figure 10:
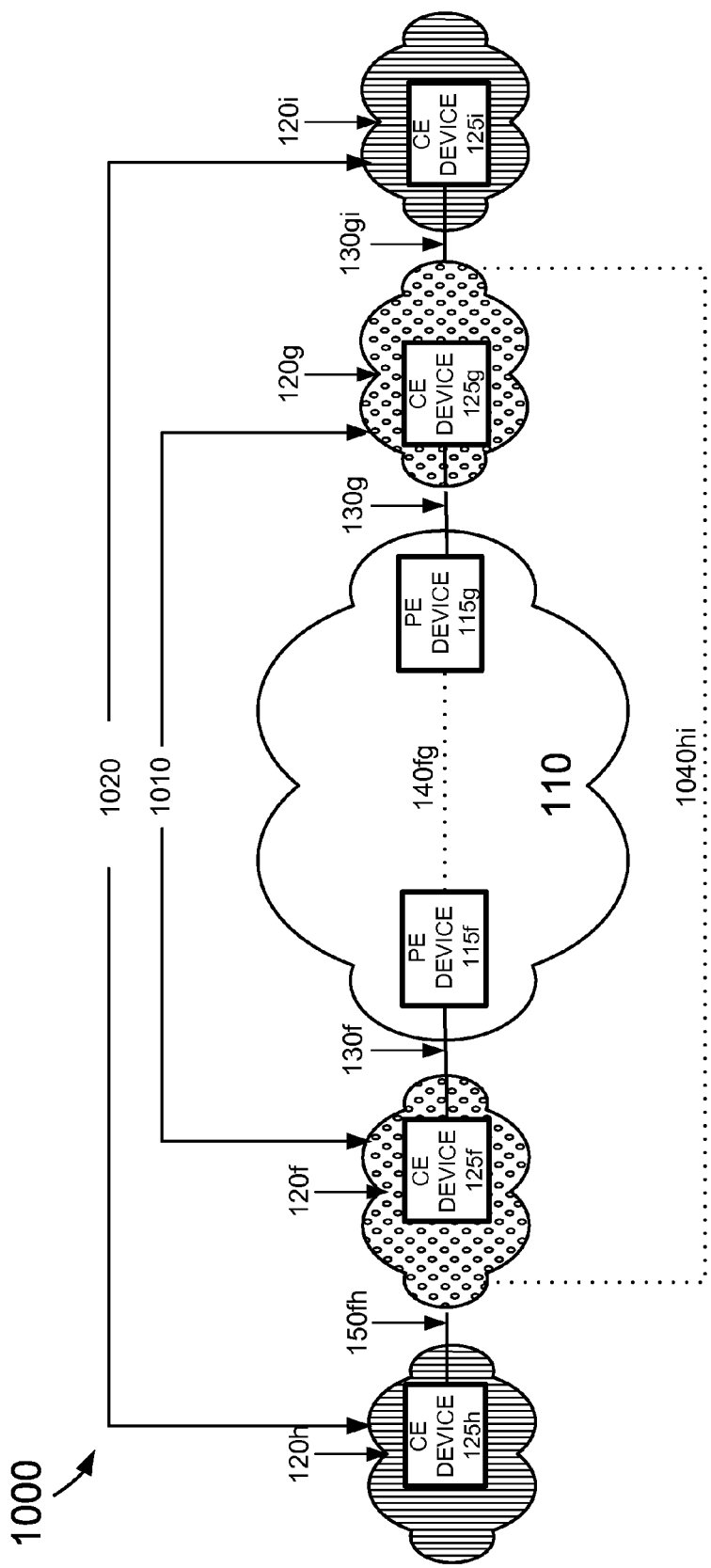
FIG. 10 is a diagram illustrating another network in which systems and/or methods described herein may be implemented.

FIG. 10 is a diagram illustrating another network in which systems and/or methods described herein may be implemented. FIG. 10 illustrated a stacked (or nested) L1VPN 1000, in which a first customer network may act as a provider network for a second customer network. Stacked L1VPN 1000 may include provider network 110 and customer networks 120f-120i.

Provider network 110 may correspond to provider network 110 illustrated in FIG. 1, and may include network nodes configured to operate as PE devices 115. FIG. 10 shows two PE devices 115f and 115g. Customer networks 120 may correspond to customer networks 120 illustrated in FIG. 1, and may include network nodes configured to operate as CE devices 125. FIG. 10 shows four customer networks 120f, 120g, 120h, and 120i.

Customer networks 120f and 120g may form a first L1VPN 1010, and may be connected via provider network 110 using an L1VPN link 140fg. First L1VPN 1010 may act as a provider network to customer networks 120h and 120i. CE device 125h may connect to customer network 120f via a connection 150fh to a node of customer network 120f that may act as a PE device with respect to customer network 120h (not shown in FIG. 10). CE device 120i may connect to customer network 120g via a connection 150gi to a node of customer network 120g that may act as a PE device with respect to customer network 120i (not shown in FIG. 10).

Customer networks 120h and 120i may form a second L1VPN 1020, and may be connected via first L1VPN 1010 using L1VPN link 1040gi. Once L1VPN link 1040gi has been created in first L1VPN 1010, the two customer networks 120h and 120i connected by L1VPN link 1040gi may operate like an independent transport network. First L1VPN 1010 may remain agnostic to services offered by second L1VPN 1020 to its customers.

FIG. 10 illustrates, for exemplary purposes, a first L1VPN stacked with a second L1VPN. However, any number of L1VPNs may be stacked, subject to a number of available columns in second overhead portion 530. For example, second L1VPN 1020 may act as a provider network to other customer networks (not shown in FIG. 10), which may set up a third L1VPN via second L1VPN 1020.

Although FIG. 10 shows exemplary components of stacked L1VPN 1000, in other implementations, stacked L1VPN 1000 may contain fewer components, different components, additional components, or differently arranged components than depicted in FIG. 10. Additionally or alternatively, one or more components of stacked L1VPN 1000 may perform one or more tasks described as being performed by one or more other components of stacked network 1000.

Additional Exemplary Data Units

Figure 11:
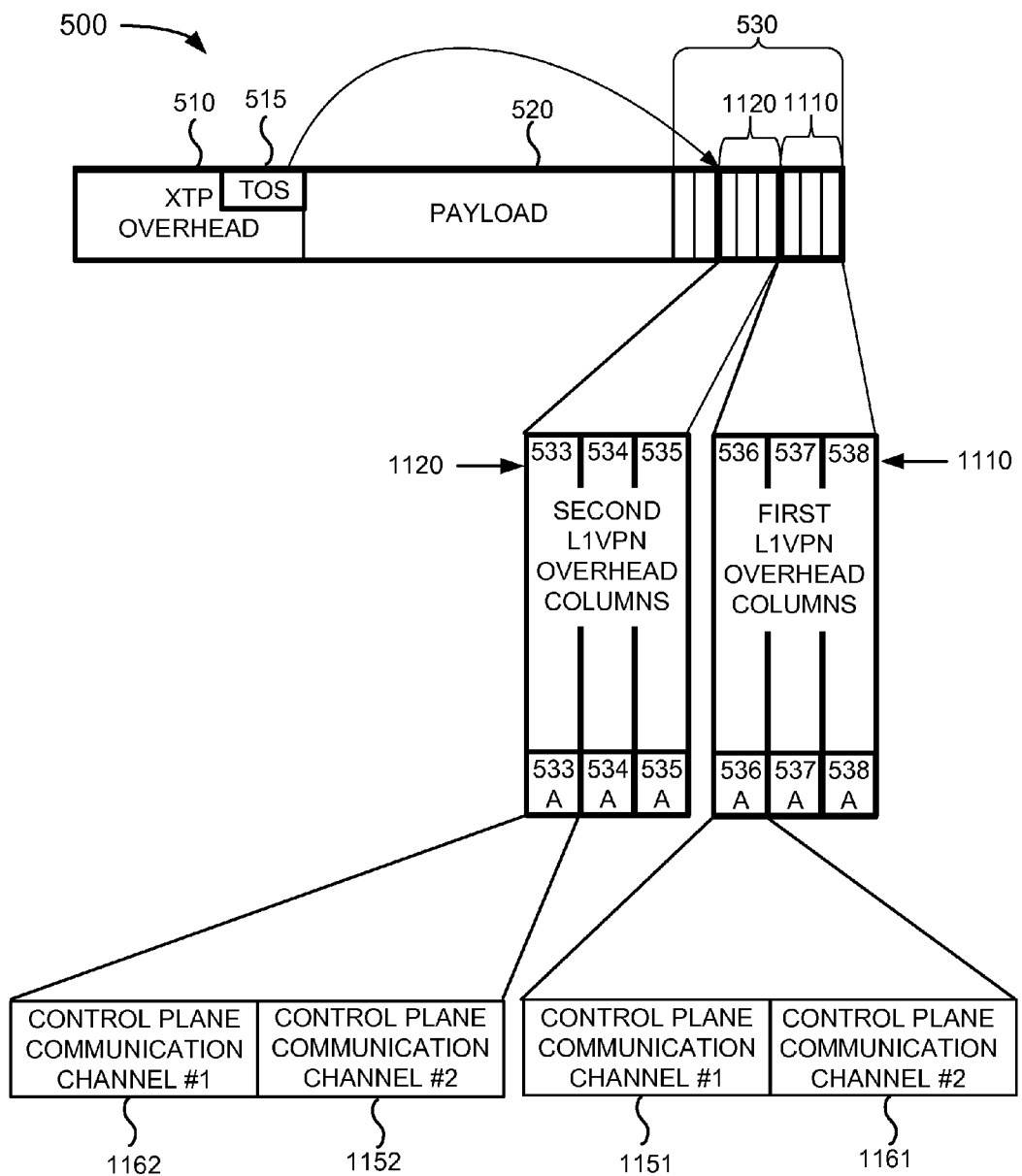
FIG. 11 is a diagram of exemplary fields of a data frame that may be transmitted within the network of FIG. 10.

FIG. 11 is a diagram of exemplary fields of a data frame 1100 that may be transmitted within the network of FIG. 10. Data frame 1100 may include a first overhead portion 510, a payload portion 520, and a second overhead portion 530. First overhead portion 510, a payload portion 520, and a second overhead portion 530 may correspond to first overhead portion 510, a payload portion 520, and a second overhead portion 530 of FIG. 5.

First overhead 510 may include TOS pointer 515. TOS pointer 515 may point to the top of the stack of data included in second overhead columns 531-538. In other words, TOS pointer 515 may indicate how many columns of second overhead 530 are being used to carry information. For example, if six second overhead columns are being used, TOS pointer 515 may point to the beginning of second overhead column 533.

Second overhead portion 530 may include one or more second overhead columns. In one implementation, second overhead portion 530 may include eight second overhead columns 531-538. In another implementation, second overhead portion 530 may include a different number of second overhead columns. One or more second overhead columns 531-538 may be combined into a first L1VPN overhead 1110 and one or more second overhead columns 531-538 may be combined into a second L1VPN overhead 1120. In one implementation, three second overhead columns may be combined into first L1VPN overhead 1110 and three different second overhead columns may be combined into second L1VPN overhead 1120. For example, second overhead columns 536-538 may be used for first L1VPN overhead 1110 and second overhead columns 533-535 may be used for second L1VPN overhead 1120.

In another implementation, a different number of second overhead columns 531-538, and/or a different combination of columns 531-538, may be combined into first L1VPN overhead 1110, and a different number of second overhead columns 531-538, and/or a different combination of columns 531-538, may be combined into second L1VPN overhead 1120. The number of columns used for first L1VPN overhead 1110 and for second L1VPN overhead 1120 may be a same number or a different number. For example, while second overhead columns 531-538 are shown in FIG. 11 as being filled from right to left (e.g., starting at second overhead column 538), this need not be the case. For example, second overhead columns 531-533 may be combined into first L1VPN overhead 1110 and second overhead columns 534-536 may be combined into second L1VPN overhead 1120.

First L1VPN overhead 1110 may correspond to overhead associated with first L1VPN 1010 of FIG. 10 and store information relating to the transmission and/or processing of frames between CE device 125f and CE device 125g. Second L1VPN 1120 may correspond to overhead associated with second L1VPN 1020 and may store information relating to the transmission and/or processing of frames between CE device 125h and CE device 125i.

Individual ones of second overhead columns 531-538 may include, among other fields, one or more communication channel fields 531A-538A (see FIG. 5). A communication channel field of one of the columns of first L1VPN overhead 1110 may include one or more control plane communication channel fields. For example, in one implementation, communication channel field 536A of second overhead column 536, or a communication channel of a different one of overhead columns 536-538 comprising first L1VPN overhead 1110, may include a first control plane communication channel field 1151 and a second control plane communication channel field 1161. In other implementations, second overhead column 536, or a different one of second overhead columns 531-538, may include a different number of control plane communication channel fields. Control plane communication channel fields 1151 and 1161 may carry control plane messages and/or management processing messages in first L1VPN 1010.

For example, control plane communication channel field 1151 may be used to carry control plane messages in first L1VPN 1010, and control plane communication channel field 1161 may be used to carry management processing messages in first L1VPN 1010 (or vice versa). As another example, control plane communication channel field 1151 may be used to carry control plane messages in first L1VPN 1010, and control plane communication channel field 1161 may be reserved for future use in first L1VPN 1010. As yet another example, control plane communication channel field 1151 and control plane communication channel field 1161 may be concatenated into a single control plane communication channel field used to carry control plane messages and/or management processing messages in first L1VPN 1010. As yet another example, control plane communication channel field 1151 may be used to carry a first subset of control plane messages in first L1VPN 1010, and control plane communication channel field 1161 may be used to carry a second subset of control plane messages in first L1VPN 1010. As yet another example, control plane communication channel field 1151 may be used to carry messages associated with a first L1VPN link between two CE devices 125 in first L1VPN 1010, and control plane communication channel field 1161 may be used to carry messages associated with a second L1VPN link between the two CE devices 125 in first L1VPN 1010. As yet another example, control plane communication channel field 1151 may be used to carry messages between two CE devices in first L1VPN 1010, while control plane communication channel field 1161 may be used to carry control plane messages between other network nodes of customer networks 120 that are served by the two CE devices in first L1VPN 1010.

In one implementation, control plane communication channel fields 1151 and 1161 may correspond to general communication channel #1 (GCC1) and general communication channel #2 (GCC2) of the ODU overhead of an ITU-T G.709 frame. The ITU-T G.709 specification does not define a use for GCC1 or GCC2. In another implementation, control plane communication channel fields 1151 and 1161 may correspond to fields in a data frame with a custom format, which differs from ITU-T G.709 frames.

For example, in one implementation, communication channel field 536A of second overhead column 533, or a communication channel of a different one of overhead columns 531-538 comprising second L1VPN overhead 1120, may include a first control plane communication channel field 1152 and a second control plane communication channel field 1162. In other implementations, second overhead column 533, or a different one of second overhead columns 533-535 comprising second L1VPN overhead 1120, may include a different number of control plane communication channel fields. Control plane communication channel fields 1152 and 1162 may carry control plane messages and/or management processing messages in second L1VPN 1020.

For example, control plane communication channel field 1152 may be used to carry control plane messages in second L1VPN 1020, and control plane communication channel field 1162 may be used to carry management processing messages in second L1VPN 1020 (or vice versa). As another example, control plane communication channel field 1152 may be used to carry control plane messages in second L1VPN 1020, and control plane communication channel field 1162 may be reserved for future use in second L1VPN 1020. As yet another example, control plane communication channel field 1152 and control plane communication channel field 1162 may be concatenated into a single control plane communication channel field used to carry control plane messages and/or management processing messages in second L1VPN 1020. As yet another example, control plane communication channel field 1152 may be used to carry a first subset of control plane messages in second L1VPN 1020, and control plane communication channel field 1162 may be used to carry a second subset of control plane messages in second L1VPN 1020. As yet another example, control plane communication channel field 1152 may be used to carry messages associated with a first L1VPN link between two CE devices 125 in second L1VPN 1020, and control plane communication channel field 1162 may be used to carry messages associated with a second L1VPN link between the two CE devices 125 in second L1VPN 1020. As yet another example, control plane communication channel field 1152 may be used to carry messages between two CE devices in second L1VPN 1020, while control plane communication channel field 1162 may be used to carry control plane messages between other network nodes of customer networks 120 that are served by the two CE devices in second L1VPN 1020.

In one implementation, control plane communication channel fields 1152 and 1162 may correspond to general communication channel #1 (GCC1) and general communication channel #2 (GCC2) of the ODU overhead of an ITU-T G.709 frame. The ITU-T G.709 specification does not define a use for GCC1 or GCC2. In another implementation, control plane communication channel fields 1152 and 1162 may correspond to fields in a data frame with a custom format, which differs from ITU-T G.709 frames.

Although FIG. 11 shows exemplary fields of data frame 1100, in other implementations, data frame 1100 may contain fewer fields, different fields, additional fields, or differently arranged fields than depicted in FIG. 11. Additionally or alternatively, one or more fields of data frame 1100 may carry information described as being carried by one or more other fields of data frame 1100.

Additional Exemplary Processes

Figure 12:
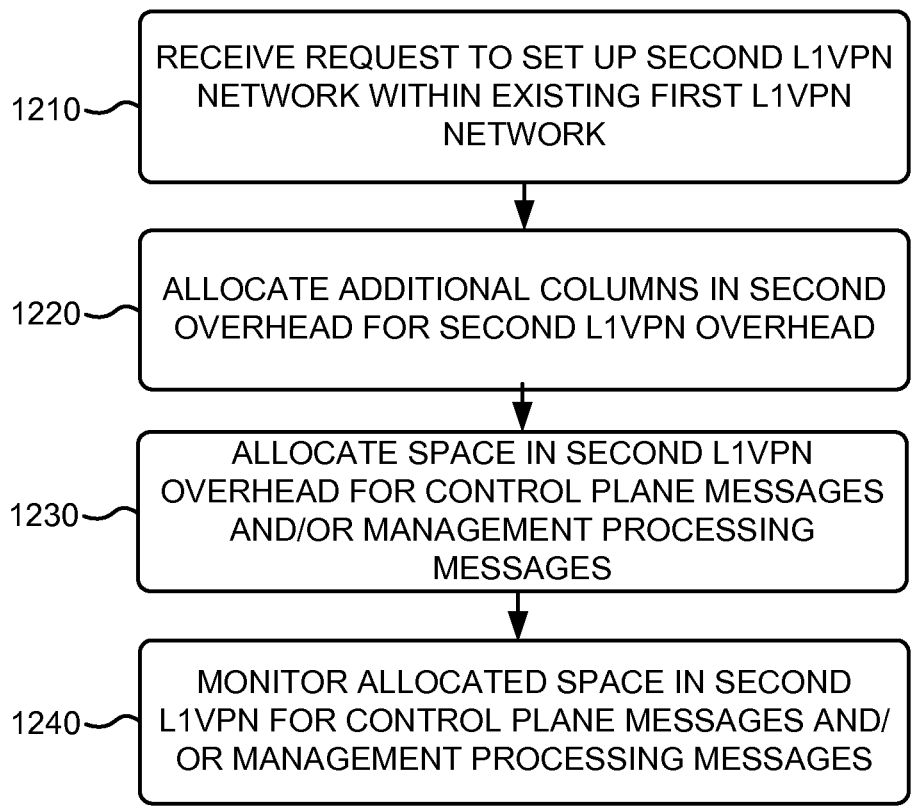
FIG. 12 is a flowchart of an exemplary process of establishing control plane processing in a stacked optical private network.

FIG. 12 is a flowchart of an exemplary process of establishing a stacked optical private network. In one implementation, the process of FIG. 12 may be performed by CE device 125. In other implementations, some or all of the process of FIG. 12 may be performed by another device or a group of devices separate from or including CE device 125.

The process of FIG. 12 may include receiving a request to set up a second L1VPN within an existing first L1VPN (block 1210). For example, a customer of first L1VPN 1010 may request L1VPN service. In one implementation, the customer may manually request the L1VPN service. In another implementation, control module 240 of CE device 125h may send a request to a PE device of customer network 120f (not shown in FIG. 10), requesting the establishment of L1VPN service between customer network 120h and customer network 120i.

Additional columns may be allocated in a second overhead for a second L1VPN overhead (block 1220). For example, control module 240 of CE device 125f may reserve columns 533-535 of second overhead 530 for a second L1VPN overhead. When CE device 125*f* receives a data frame from CE device 125*h*, CE device 125*f* may shift second L1VPN overhead 1120 three columns to the left and insert first L1VPN overhead 1110 into the columns previously occupied by second L1VPN overhead 1120, before sending the data frame to CE device 125*g*.

A first space may be allocated in the second L1VPN for control plane messages and a second space may be allocated in the L1VPN overhead for management processing messages (block 1230). For example, control module 240 of CE device 125*h* may reserve first control plane communication channel field 1152 for control plane processing, and a particular line module 210, which connects CE device 125*h* to L1VPN link 150*fh*, may be configured to populate first control plane communication channel field 1152 of data frames that are sent to CE device 125*i* with control plane messages. Furthermore, control module 240 of CE device 125*h* may reserve second control plane communication channel field 560 for management processing, and a particular line module 210, which connects CE device 125*h* to L1VPN link 150*fh*, may be configured to populate second control plane communication channel field 1162 of data frames that are sent to CE device 125*i* with management processing messages.

Allocated first space in second L1VPN overhead of received data frames may be monitored for control plane messages and allocated second space in second L1VPN overhead of received data frames may be monitored for management messages (block 1240). For example, a particular line card module 210, which connects CE device 125*h* to L1VPN link 150*fh*, may be instructed by control module 240 to monitor first control plane communication channel field 1152 of data frames received from CE device 125*i* for control plane messages and to monitor second control plane communication channel field 1162 of data frames 1162 received from CE device 125*i* for management messages.

Figure 13:
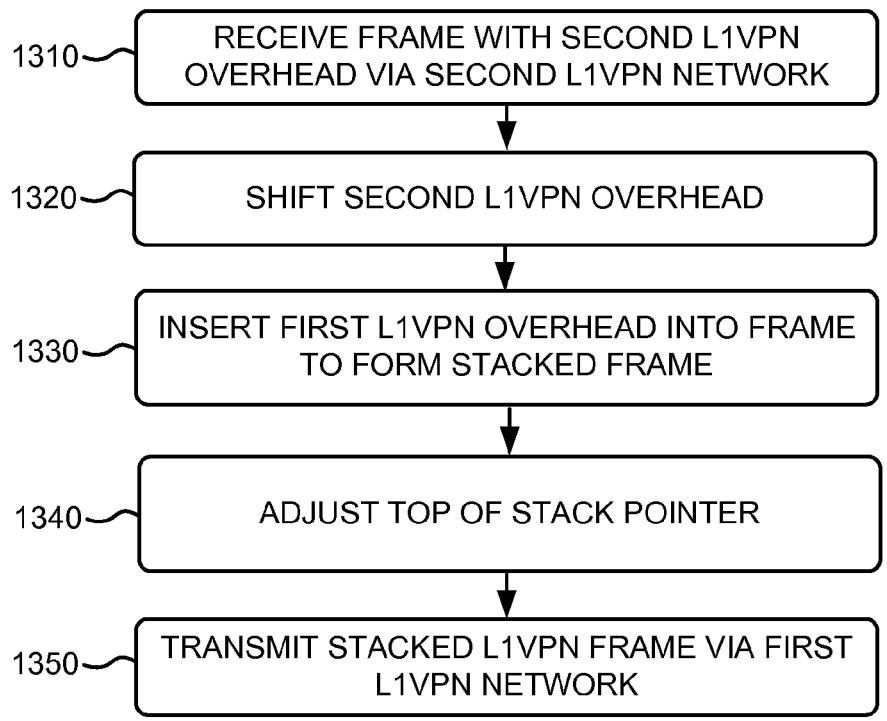
FIG. 13 is a flowchart of an exemplary process of transmitting a data frame in a stacked optical private network.

FIG. 13 is a flowchart of an exemplary process of transmitting a control plane message in a stacked optical private network. In one implementation, the process of FIG. 13 may be performed by CE device 125. In other implementations, some or all of the process of FIG. 13 may be performed by another device or a group of devices separate from or including CE device 125.

The process of FIG. 13 may include receiving a data frame with a second L1VPN overhead via a second L1VPN (block 1310). For example, CE device 125*f* may receive data frame 1100, which includes second L1VPN overhead 1120 in second overhead columns 535-538, from customer network 120*h*. A second L1VPN overhead may be shifted (block 1320). For example, CE device 125*f* may shift second L1VPN overhead 1120 from columns 535-538 to columns 533-535.

A first L1VPN overhead may be inserted into the received data frame to generate a stacked L1VPN frame (block 1330). For example, CE device 125*f* may add first L1VPN overhead 1110 to data frame 1100 to generate stacked L1VPN frame 1100. In one implementation, egress controller 420 of control module 240 may instruct line module 210 to insert second L1VPN frame 1100 into data frame 110. In another implementation, second overhead 1120 may be added by line card 210 without instructions from egress controller 420. A top of stack pointer may be adjusted (block 1340). For example, CE device 125*f* may adjust TOS pointer 515, which may have been pointing to second overhead column 535, to point to second overhead column 533. In one implementation, TOS pointer 515 may be adjusted by egress controller 420. In another implementation, TOS pointer 515 may be adjusted by line card 210, or by another component of CE device 125*f*. The stacked L1VPN frame may be transmitted (block 1350).

For example, line card 210 may transmit stacked L1VPN data frame 1100 via L1VPN link 140*fg*.

Figure 14:
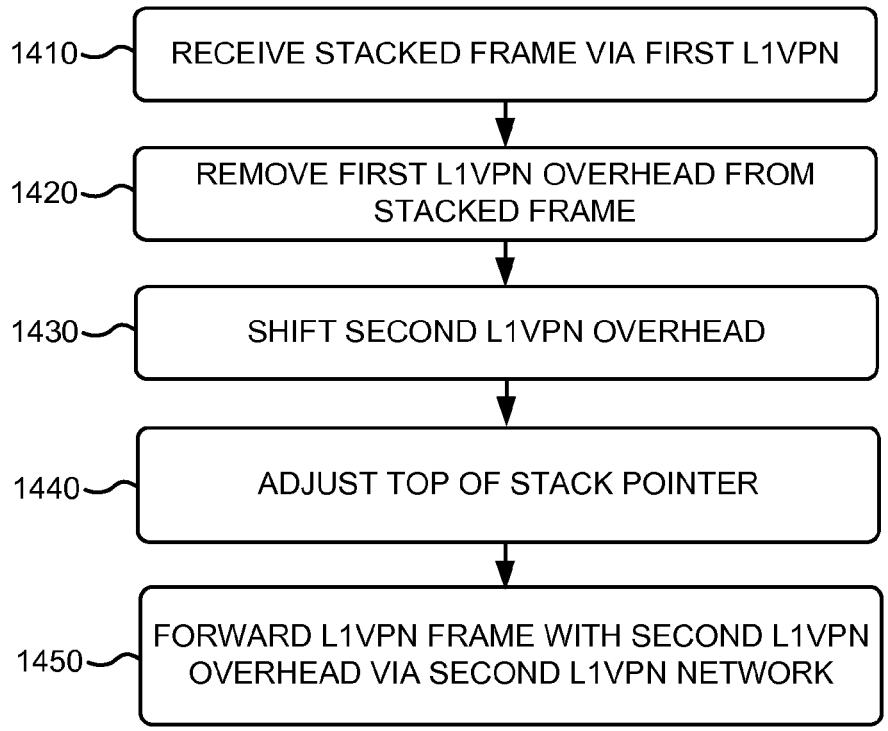
FIG. 14 is a flowchart of an exemplary process of receiving a data frame in a stacked optical private network.

FIG. 14 is a flowchart of an exemplary process of receiving a control plane message in a stacked optical private network. In one implementation, the process of FIG. 14 may be performed by CE device 125. In other implementations, some or all of the process of FIG. 14 may be performed by another device or a group of devices separate from or including CE device 125.

The process of FIG. 14 may include receiving a stacked L1VPN data frame via a first L1VPN link (block 1410). For example, CE device 125*g* may receive stacked L1VPN data frame 1100, which includes first L1VPN overhead 1110 in second overhead columns 535-538 and second L1VPN overhead 1120 in second overhead columns 533-535, from PE device 115*g*. A first L1VPN overhead may be removed from the received stacked L1VPN frame (block 1420). For example, CE device 125*g* may remove first L1VPN overhead 1110 from stacked L1VPN data frame 1100.

A second L1VPN overhead may be shifted (block 1430). For example, CE device 125*g* may shift second L1VPN overhead 1120 from columns 533-535 to columns 535-538. A top of stack pointer may be adjusted (block 1440). For example, CE device 125*g* may adjust TOS pointer 515, which may have been pointing to second overhead column 533, to point to second overhead column 535. In one implementation, TOS pointer 515 may be adjusted by egress controller 420. In another implementation, TOS pointer 515 may be adjusted by line card 210, or by another component of CE device 125*g*. The data frame with a second L1VPN overhead may be forwarded via a second L1VPN (block 1450). For example, line card 210 of CE device 125*g* may transmit data frame 1100, with second L1VPN overhead included in second overhead columns 535-538, via L1VPN link 130*gi* to CE device 120*i*.

EXAMPLES

Figure 15A:
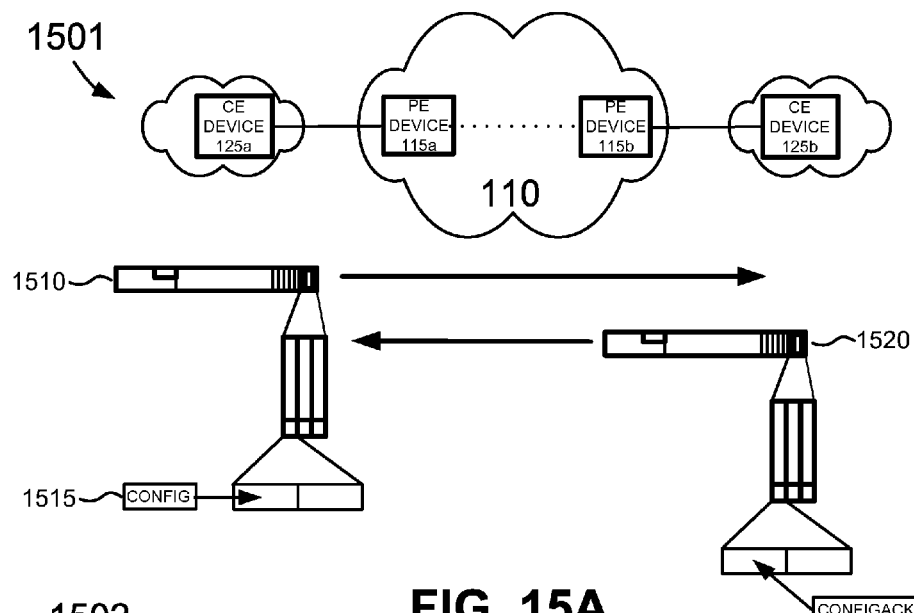
FIGS. 15A-15C are diagrams illustrating an example of the systems and methods described herein.
Figure 15B:
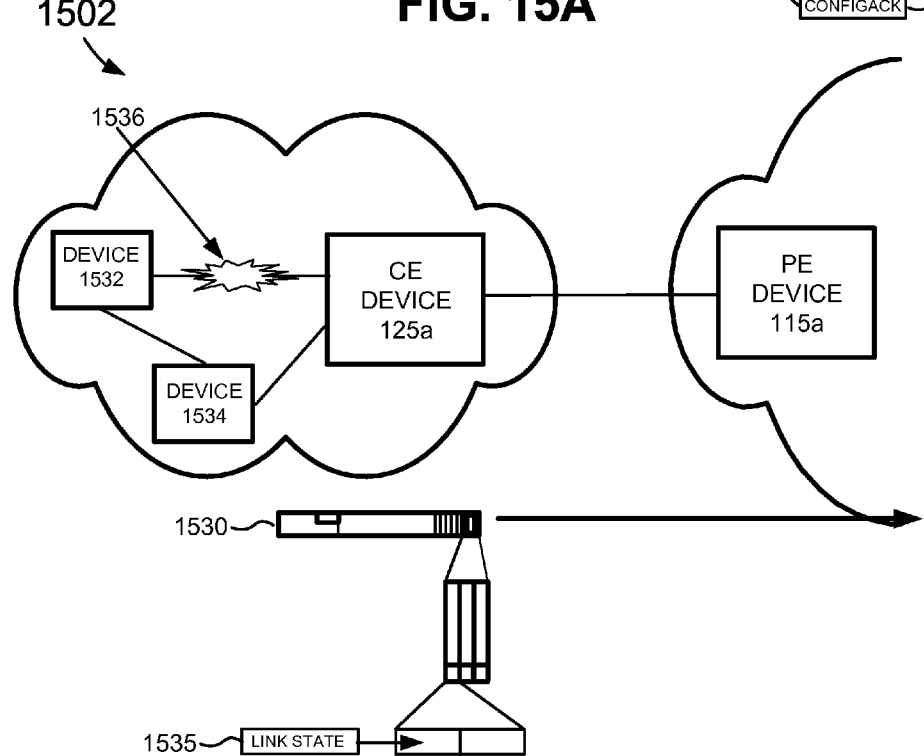
Figure 15C:
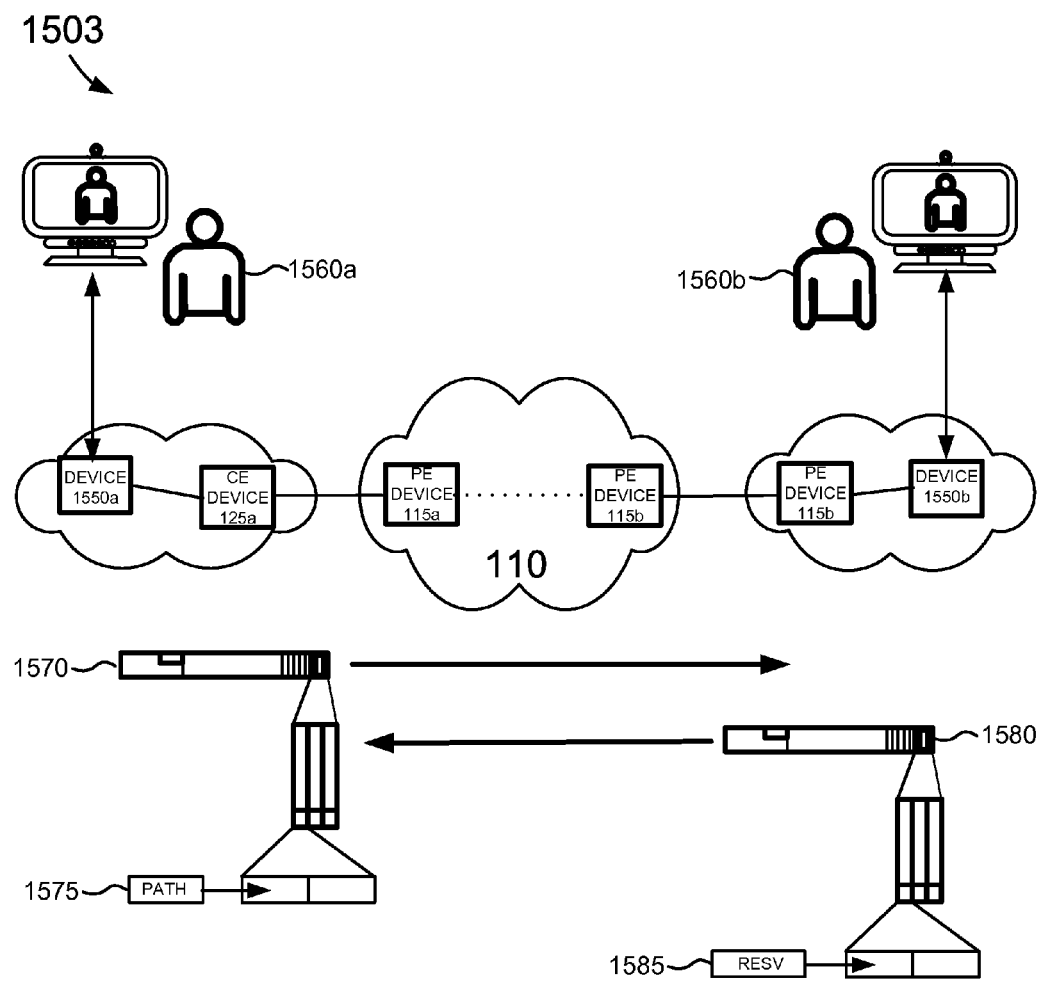

FIGS. 15A-15C are diagrams illustrating an example of systems and methods described herein. FIG. 15A illustrates an example 1501 of setting up an optical communication path between two CE devices in an L1VPN across a provider network. CE device 125*a* may transmit data frame 1510 to PE device 115*a*. Data frame 1510 may include data intended to be received by a particular node in a remote customer network. Control module 240 of CE device 125*a* may insert a LMP CONFIG packet 1515 into control plane communication channel field 550 of L1VPN frame 1510. Control module 240 of CE device 125*b* may retrieve LMP CONFIG packet 1515 from L1VPN frame 1510 and may process link configuration information included in LMP CONFIG packet 1515.

CE device 125*b* may transmit data frame 1520 to CE device 125*a*. Control module 240 of CE device 125*b* may insert a LMP CONFIGACK packet 1525 into control plane communication channel field 550 of L1VPN frame 1520, indicating that LMP CONFIG packet 1515 was successfully received. Thus, a link between CE device 125*a* and CE device 125*b* may be established.

FIG. 15B illustrates an example 1502 of providing routing information from a first CE device to a second CE device in an L1VPN across a provider network. Assume that CE device 125*a* is connected to two nodes in the customer network, device 1532 and device 1534. For example, device 1534 may include a protection path (i.e., a back-up path) to device 1532, which may be activated in case a connection to device 1532 fails. Assume that CE device 125*a* detects a failed connection to device 1532. For example, CE device 125*a* may fail to receive an acknowledgment signal from device 1532. CE device 125a may need to forward this information to a remote customer network that is part of the L1VPN of CE device 125a.

CE device 125a may transmit data frame 1530 to PE device 115a. L1VPN frame 1530 may include data intended to be received by a particular node in a remote customer network. Control module 240 of CE device 125a may insert an OSPF link state packet 1535 into control plane communication channel field 550 of data frame 1530. The OSPF link state packet 1535 may be retrieved by control module 240 of CE device 125b of the remote customer network (not shown in FIG. 15B).

FIG. 15C illustrates an example 1503 of a video conference between user 1560a and user 1560b, located at remote customer sites. User 1560a may be connecting to an L1VPN using a first device 1550a at a first customer site, while user 1560b may be connecting to the L1VPN using a second device 1550b at a second customer site. Part of the process of setting up a video conference link may include provisioning a flow with the necessary bandwidth and QoS requirement between CE device 125a and CE device 125b.

CE device 125a may transmit data frame 1570 to PE device 115a. Data frame 1570 may include data intended to be received by a particular node in a remote customer network. Control module 240 of CE device 125a may insert a RSVP-TE PATH packet 1575 into control plane communication channel field 550 of L1VPN frame 1570. Control module 240 of CE device 125b may retrieve RSVP-TE RESV packet 1575 from data frame 1570 and may process flow reservation information included in RSVP-TE RESV packet 1575. For example, control module 240 of CE device 125b may reserve the necessary bandwidth between CE device 125b and user device 1560b.

CE device 125b may transmit data frame 1580 to CE device 125a. Control module 240 of CE device 125b may insert a RSVP-TE RESV packet 1585 into control plane communication channel field 550 of L1VPN frame 1580, indicating that the required flow has been reserved.

Figure 16:
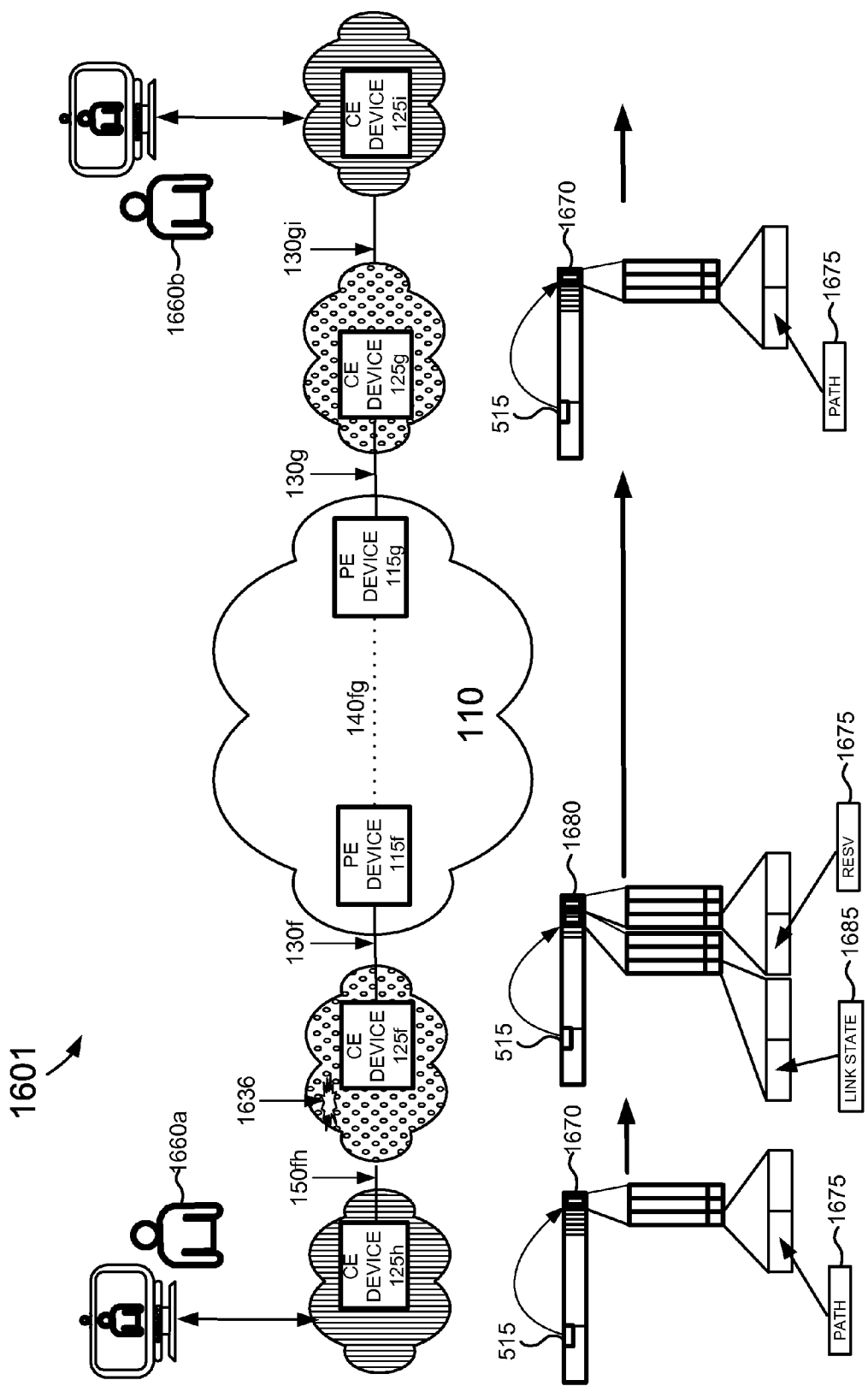
FIG. 16 is a diagram illustrating another example of the systems and methods described herein.

FIG. 16 is a diagram illustrating an example 1601 of sending control plane messages in a stacked L1VPN, in which a first L1VPN (which includes CE devices 125f and 125g) acts as a provider network to a second L1VPN (which includes CE devices 125h and 125i). Assume user 1660a and user 1660b, located at remote customer sites, want to set up a video conference. User 1660a may be connecting to a second L1VPN using a first device 1650a at a first customer site, while user 1660b may be connecting to the second L1VPN using a second device 1650b at a second customer site. Part of the process of setting up a video conference link may include provisioning a flow with the necessary bandwidth and QoS requirement between CE device 125h and CE device 125i. Assume that, at substantially the same time, CE device 125f of the first L1VPN detects a broken link 1636. CE device 125f may need to forward this information to a remote customer network that is part of the first L1VPN of CE device 125f.

CE device 125h may transmit data frame 1670 to a PE device of the first L1VPN (not shown in FIG. 16). Control module 240 of CE device 125h may insert a RSVP-TE PATH packet 1675 into control plane communication channel field 1152 of L1VPN frame 1670.

CE device 125f may receive data frame 1670, and may add second overhead 1120 to generate a stacked L1VPN data frame 1680. Control module 240 of CE device 125f may insert an OSPF link state packet 1685 into control plane communication channel field 1151 of stacked L1VPN frame 1680.

CE device 125g may receive stacked L1VPN data frame 1680 and may remove second L1VPN overhead 1120 from stacked L1VPN data frame 1670. The OSPF link state packet 1685 may be retrieved by control module 240 of CE device 125g and control module 240 of CE device 125g may update control plane database 440 of CE device 125g based on information included in OSPF link state packet 1685.

CE device 125g may forward data frame 1670 CE device 125i. Control module 240 of CE device 125i may retrieve RSVP-TE RESV packet 1675 from data frame 1670 and may process flow reservation information included in RSVP-TE PATH packet 1675. For example, control module 240 of CE device 125g may reserve the necessary bandwidth between CE device 125g and a device associated with user 1660b.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9 and 12-14, the order of the blocks may be modified in other implementations. Further, non-dependent blocks may be performed in parallel.

Also, certain portions of the implementations have been described as a "component" that performs one or more functions. The term "component" may include hardware, such as a processor, an ASIC, or a FPGA, or a combination of hardware and software (e.g., software running on a general purpose processor). The term "hardware component," as used herein, may refer to a component that is implemented strictly in hardware, such as an ASIC or an FPGA.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by an optical node, operating as a first network edge device of an optical layer one virtual private network (L1VPN), the method comprising:
generating, by a first module of the optical node, a first optical data frame, where the first optical data frame includes an L1VPN overhead, and where the L1VPN overhead includes a control plane communication field;
generating, by a second module of the optical node, a first control plane message for a second network edge device of the optical L1VPN, where the second network edge device is connected to the first network edge device across a provider network via an optical L1VPN link;
incorporating, by the first module, the first control plane message into the control plane communication field of the first optical data frame;
transmitting, by the first module, the first optical data frame to the second network edge device via the optical L1VPN link; and
encoding the generated first control plane message into a format compatible with the control plane communication field.

2. The method of claim 1, where the first control plane message relates to at least one of link management, routing, resource reservation, or traffic engineering.

3. The method of claim 1, where the first control plane message includes at least one of a Link Management Protocol (LMP) packet, an Open Shortest Path First-Traffic Engineering (OSPF-TE) packet, or a Resource Reservation Protocol-Traffic Engineering (RSVP-TE) packet.

4. A method performed by an optical node, operating as a first network edge device of an optical layer one virtual private network (L1VPN), the method comprising:
generating, by a first module of the optical node, a first optical data frame, where the first optical data frame includes an L1VPN overhead, and where the L1VPN overhead includes a control plane communication field;
generating, by a second module of the optical node, a first control plane message for a second network edge device of the optical L1VPN, where the second network edge device is connected to the first network edge device across a provider network via an optical L1VPN link;
incorporating, by the first module, the first control plane message into the control plane communication field of the first optical data frame;
transmitting, by the first module, the first optical data frame to the second network edge device via the optical L1VPN link;
receiving, from the second network edge device, a second optical data frame across the provider network via the optical L1VPN link;
detecting that the control plane communication field of the L1VPN overhead of the second optical data frame includes a second control plane message;
retrieving the second control plane message from the control plane communication field of the second optical data frame; and
performing a control plane operation based on the retrieved second control plane message.

5. The method of claim 4, further comprising:
generating a control plane protocol packet based on the retrieved second control plane message.

6. A method performed by an optical node, operating as a first network edge device of an optical layer one virtual private network (L1VPN), the method comprising:
generating, by a first module of the optical node, a first optical data frame, where the first optical data frame includes an L1VPN overhead, and where the L1VPN overhead includes a control plane communication field;
generating, by a second module of the optical node, a first control plane message for a second network edge device of the optical L1VPN, where the second network edge device is connected to the first network edge device across a provider network via an optical L1VPN link;
incorporating, by the first module, the first control plane message into the control plane communication field of the first optical data frame; and
transmitting, by the first module, the first optical data frame to the second network edge device via the optical L1VPN link,
where the L1VPN overhead includes information corresponding to information included in an optical data unit (ODU) overhead of an ITU-T G.709 frame and where the control plane communication field corresponds to a general communication channel field of the ODU overhead.

7. A method performed by an optical node, operating as a first network edge device of an optical layer one virtual private network (L1VPN), the method comprising:
generating, by a first module of the optical node, a first optical data frame, where the first optical data frame includes an L1VPN overhead, and where the L1VPN overhead includes a control plane communication field;
generating, by a second module of the optical node, a first control plane message for a second network edge device of the optical L1VPN, where the second network edge device is connected to the first network edge device across a provider network via an optical L1VPN link;
incorporating, by the first module, the first control plane message into the control plane communication field of the first optical data frame; and
transmitting, by the first module, the first optical data frame to the second network edge device via the optical L1VPN link,
where the L1VPN overhead includes a management processing communication field, the method further comprising:
receiving, from at least one of a user or a management server, a query relating to management processing associated with the second network edge device; and
generating a first management processing message based on the received query; and
incorporating the generated first management processing message into the management processing communication field of the L1VPN overhead.

8. The method of claim 7, further comprising:
receiving, from the second network edge device, a second optical data frame across the provider network via the optical L1VPN link;
detecting that the management processing communication field of the L1VPN overhead of the second optical data frame includes a second management processing message;
retrieving the second management processing message from the management processing communication field of the second optical data frame;
determining that the second management processing message includes a query requesting information relating to management processing of the optical node;
retrieving the requested information from a management processing database;
generating a third management processing message based on the retrieved information; and incorporating the generated third management processing message into the management processing communication field of the L1VPN overhead.

9. A method performed by an optical node, operating as a first network edge device of an optical layer one virtual private network (L1VPN), the method comprising:
generating, by a first module of the optical node, a first optical data frame, where the first optical data frame includes an L1VPN overhead, and where the L1VPN overhead includes a control plane communication field;
generating, by a second module of the optical node, a first control plane message for a second network edge device of the optical L1VPN, where the second network edge device is connected to the first network edge device across a provider network via an optical L1VPN link;
incorporating, by the first module, the first control plane message into the control plane communication field of the first optical data frame;
transmitting, by the first module, the first optical data frame to the second network edge device via the optical L1VPN link;
receiving a second optical data frame via a second optical L1VPN, where the optical L1VPN functions as a provider network for the second optical L1VPN, and where the second optical data frame includes a second L1VPN overhead that relates to transmission and processing of frames between network edge devices of the second optical L1VPN;
adding a first L1VPN overhead to the second optical data frame to generate a stacked L1VPN optical data frame, where the first L1VPN overhead relates to transmission and processing of frames between network edge devices of the optical L1VPN; and
transmitting the stacked L1VPN optical data frame via the optical L1VPN link.

10. The method of claim 9, where the second L1VPN overhead includes a second control plane message in a control plane communication field of the second L1VPN overhead, and where the first L1VPN overhead includes the first control plane message.

11. A method performed by an optical node, operating as a first network edge device of an optical layer one virtual private network (L1VPN), the method comprising:
generating, by a first module of the optical node, a first optical data frame, where the first optical data frame includes an L1VPN overhead, and where the L1VPN overhead includes a control plane communication field;
generating, by a second module of the optical node, a first control plane message for a second network edge device of the optical L1VPN, where the second network edge device is connected to the first network edge device across a provider network via an optical L1VPN link;
incorporating, by the first module, the first control plane message into the control plane communication field of the first optical data frame;
transmitting, by the first module, the first optical data frame to the second network edge device via the optical L1VPN link,
receiving a stacked L1VPN optical data frame, where the stacked L1VPN optical data frame includes a second L1VPN overhead that relates to transmission and processing of frames between network edge devices of a second optical L1VPN, where the stacked L1VPN optical data frame includes a first L1VPN overhead that relates to transmission and processing of frames between network edge devices of the optical L1VPN, and where the optical L1VPN functions as a provider network for the second optical L1VPN;
removing the first L1VPN overhead from the stacked L1VPN optical data frame; and
transmitting a second optical data frame that includes the second L1VPN overhead to a network edge device of the second optical L1VPN.

12. A network node, configured to operate as a first network edge device of an optical layer one virtual private network (L1VPN), comprising:
one or more first modules to:
generate a first optical data frame, where the first optical data frame includes an L1VPN overhead, and where the L1VPN overhead includes a control plane communication field;
receive a first control plane message, where the first control plane message relates to a control plane processing operation in the optical L1VPN;
populate the control plane communication field with the first control plane message; and
transmit the first optical data frame to the second network edge device, associated with the optical L1VPN, across a provider network via an optical L1VPN link; and
a second module to:
perform control plane processing associated the optical L1VPN;
generate the first control plane message; and
provide the first control plane message to one of the one or more first modules.

13. The network node of claim 12, where the second module is further to:
encode the generated first control message into a format compatible with the field of the overhead.

14. The network node of claim 12, where the one or more first modules are further to:
receive a second optical data frame from the second network edge device;
detect that the control plane communication field of the L1VPN overhead of the second optical data frame includes a second control plane message;
retrieve the second control plane message from the control plane communication field of the L1VPN overhead of the second optical data frame; and
provide the retrieved second control plane message to the second module; and
where the second module is further to:
perform a control plane operation based on the retrieved second control plane message.

15. The network node of claim 14, where the second module is further to:
generate a control plane protocol packet based on the retrieved second control plane message.

16. The network node of claim 14, where the L1VPN overhead includes a management processing communication field, where the second module is further to: receive, from at least one of a user or a management server, a query relating to management processing associated with the second network edge device; and generate a first management processing message based on the received query; and where the first module is further to:
incorporate the generated first management processing message into the management processing communication field of the L1VPN overhead.

17. The network node of claim 12, where the one or more first modules are further to:
receive a second optical data frame via a second optical L1VPN, where the optical L1VPN functions as a provider network for the second optical L1VPN, and where the second optical data frame includes a second L1VPN overhead that relates to transmission and processing of frames between network edge devices of the second optical L1VPN;

add a second L1VPN overhead to the received optical data frame to generate a stacked L1VPN optical data frame, where the L1VPN overhead relates to transmission and processing of frames between network edge devices of the optical L1VPN; and transmit the stacked optical L1VPN frame via the optical L1VPN link.

18. The network node of claim 12, where the one or more first modules are further to:

receive a stacked L1VPN optical data frame, where the stacked L1VPN optical data frame includes a second L1VPN overhead that relates to transmission and processing of frames between network edge devices of a second optical L1VPN, where the stacked L1VPN optical data frame includes a first L1VPN overhead that relates to transmission and processing of frames between network edge devices of the optical L1VPN, and where the optical L1VPN functions as a provider network for the second optical L1VPN;

remove the first L1VPN overhead from the stacked L1VPN optical data frame; and transmit the stacked L1VPN optical data frame to a network edge device of the second optical L1VPN, where the stacked L1VPN optical data frame includes the second L1VPN overhead.

19. A network edge device comprising:

means for generating an optical data frame for transmission in an optical layer one virtual private network (L1VPN), where the optical data frame includes an L1VPN overhead, and where the L1VPN overhead includes a control plane communication field;

means for generating a control plane message for a second network edge device of the optical L1VPN, where the control plane message relates to a control plane processing operation in the optical L1VPN;

means for incorporating the first control plane message into the control plane communication field;

means for transmitting the first optical L1VPN frame to the second network edge device via an optical L1VPN link associated with the optical L1VPN; and means for encoding the generated first control plane message into a format compatible with the control plane communication field.

* * * * *